United States Patent
Shiroya et al.

(10) Patent No.: US 12,453,691 B2
(45) Date of Patent: Oct. 28, 2025

(54) COMPOSITION COMPRISING HYALURONIC ACID-BASED POLYION COMPLEX PARTICLE

(71) Applicant: L'Oreal, Paris (FR)

(72) Inventors: Toshifumi Shiroya, Kawasaki (JP);
Tatsushi Isojima, Kawasaki (JP);
Mariko Yamamoto, Kawasaki (JP);
Takehiko Kasai, Kawasaki (JP);
Kazuhiko Maruyama, Kawasaki (JP);
Shinobu Mitsuda, Kawasaki (JP)

(73) Assignee: L'Oreal, Paris (FR)

( * ) Notice: Subject to any disclaimer, the term of this patent is extended or adjusted under 35 U.S.C. 154(b) by 595 days.

(21) Appl. No.: 17/785,019

(22) PCT Filed: Dec. 4, 2020

(86) PCT No.: PCT/JP2020/046188
§ 371 (c)(1),
(2) Date: Jun. 13, 2022

(87) PCT Pub. No.: WO2021/125069
PCT Pub. Date: Jun. 24, 2021

(65) Prior Publication Data
US 2023/0051904 A1 Feb. 16, 2023

(30) Foreign Application Priority Data
Dec. 17, 2019 (JP) ................ 2019-227501

(51) Int. Cl.
*A61K 8/73* (2006.01)
*A61K 8/34* (2006.01)
*A61K 8/55* (2006.01)
*A61K 8/64* (2006.01)
*A61Q 19/00* (2006.01)

(52) U.S. Cl.
CPC ............. *A61K 8/735* (2013.01); *A61K 8/34* (2013.01); *A61K 8/55* (2013.01); *A61K 8/64* (2013.01); *A61Q 19/007* (2013.01); *A61K 2800/5424* (2013.01); *A61K 2800/5426* (2013.01); *A61K 2800/5428* (2013.01); *A61K 2800/95* (2013.01)

(58) Field of Classification Search
CPC . A61K 8/736; A61K 8/34; A61K 8/55; A61K 8/64; A61K 2800/5424; A61K 2800/5428; A61K 2800/95; A61Q 19/007
See application file for complete search history.

(56) References Cited

U.S. PATENT DOCUMENTS
2018/0369080 A1 12/2018 Kasai et al.

FOREIGN PATENT DOCUMENTS

| | | |
|---|---|---|
| CN | 101415731 A | 4/2009 |
| CN | 106413682 A | 2/2017 |
| CN | 106890127 A | 6/2017 |
| CN | 109862876 A | 6/2019 |
| EP | 2 166 022 A1 | 3/2010 |
| JP | A-2017-031125 | 2/2017 |
| JP | 2018-062484 A | 4/2018 |
| JP | A-2018-070530 | 5/2018 |
| JP | A-2019-001726 | 1/2019 |
| JP | A-2019-001727 | 1/2019 |
| WO | WO 2008/133267 | 11/2008 |
| WO | WO-2017104221 A1 * | 6/2017 ........... A61K 8/0208 |
| WO | 2018/230739 A1 | 12/2018 |

OTHER PUBLICATIONS

Third Party Observations for Chinese Application No. 2019-227501, mailed Jul. 3, 2023.
Office Action mailed Apr. 27, 2023, issued in corresponding Chinese Application No. 202080086278.9, filed Dec. 4, 2020, 24 pages.
International Search Report mailed Apr. 9, 2021, issued in corresponding International Patent Application No. PCT/JP2020/046188, filed Dec. 4, 2020, 4 pages.
Moisture Gel Spf 50+/PA++++, ID# 4725217, Mintel GNPD[online] Apr. 2017, [retrieved: Oct. 27, 2023], <URL:http://www.gnpd.com>.
CC Cream SPF 35/PA+++, ID# 2304811, Mintel GNPD[online], Jan. 2014, [retrieved: Oct. 27, 2023], <URL:http://www.gnpd.com>.
Cream, ID# 3013991, Mintel GNPD[online], Mar. 2015, [retrieved: Oct. 27, 2023], <URL:http://www.gnpd.com>.
Office Action for JP 2019-227501, mailed Nov. 6, 2023, translation included (17 pages).

* cited by examiner

*Primary Examiner* — Zohreh A Fay
(74) *Attorney, Agent, or Firm* — Christensen O'Connor Johnson Kindness PLLC

(57) ABSTRACT

The present invention relates to a composition comprising: (a) at least one particle comprising at least one cationic polymer and at least one anionic polymer, at least one cationic polymer and at least one amphoteric polymer, at least one anionic polymer and at least one amphoteric polymer, or at least one amphoteric polymer, and at least one non-polymeric acid having two or more pKa values or salt(s) thereof or at least one non-polymeric base having two or more pKb values or salt(s) thereof; and (b) water, wherein the anionic polymer is selected from hyaluronic acid and derivatives thereof, and the amphoteric polymer is selected from cationized hyaluronic acid and salts thereof. The composition according to the present invention is stable, and can have a variety of cosmetic functions. The stickiness of the composition according to the present invention can be reduced.

16 Claims, No Drawings

COMPOSITION COMPRISING HYALURONIC ACID-BASED POLYION COMPLEX PARTICLE

TECHNICAL FIELD

The present invention relates to a composition including polyion complex particles and a film of polyion complex particles, as well as a process for preparing a film by using polyion complex particles and a cosmetic process using polyion complex particles.

BACKGROUND ART

Hyaluronic acid is a predominant glucosaminoglycan found in the skin. Thus, the fibroblasts synthesize predominantly collagens, matrix glycoproteins other than collagens (fibronectin, laminin), proteoglycans and elastin. The keratinocytes, for their part, synthesize predominantly sulfated glycosaminoglycans and hyaluronic acid. Hyaluronic acid is also called hyaluronan (HA).

Hyaluronic acid is present in the free state in the epidermis and in the dermis and is responsible for turgescence of the skin. This polysaccharide can in fact retain a large volume of water, corresponding to up to 1000 times its weight. In this sense, hyaluronic acid plays an important role in increasing the amounts of water bound in the tissue, and also in the mechanical properties of the skin and in wrinkle formation.

Hyaluronic acid has been widely used as a cosmetic ingredient due to its high moisturizing effects.

However, an aqueous solution of hyaluronic acid is sticky, and this may result in an uncomfortable texture. Also, a hyaluronic acid film, which is formed when an aqueous solution of hyaluronic acid dries on the skin, is sticky, and such a film may also result in an uncomfortable texture.

DISCLOSURE OF INVENTION

Thus, a first objective of the present invention is to provide a composition which is capable of providing cosmetic effects based on hyaluronic acid, while reducing the stickiness due to hyaluronic acid.

The above objective of the present invention can be achieved by a composition, comprising:
(a) at least one particle, comprising
  at least one cationic polymer and at least one anionic polymer,
  at least one cationic polymer and at least one amphoteric polymer,
  at least one anionic polymer and at least one amphoteric polymer, or
  at least one amphoteric polymer,
  and
  at least one non-polymeric acid having two or more pKa values or salt(s) thereof or
  at least one non-polymeric base having two or more pKb values or salt(s) thereof;
  and
(b) water,
wherein
the anionic polymer is selected from hyaluronic acid and derivatives thereof, and
the amphoteric polymer is selected from cationized hyaluronic acid and salts thereof.

The cationized hyaluronic acid may have at least one quaternary ammonium group-containing group and has a degree of cationization of 0.05 to 0.6, preferably from 0.1 to 0.5, and more preferably from 0.15 to 0.4.

The cationic polymer may have at least one positively chargeable and/or positively charged moiety selected from the group consisting of a secondary or tertiary amino group, a quaternary ammonium group, a guanidine group, a biguanide group, an imidazole group, an imino group, a pyridyl group, and an amino group.

The cationic polymer may be selected from the group consisting of cyclopolymers of alkyldiallylamine and cyclopolymers of dialkyldiallylammonium such as (co)polydiallyldialkyl ammonium chloride, (co)polyamines such as (co)polylysines, cationic (co)polyaminoacids such as collagen, cationic cellulose polymers, and salts thereof.

The total amount of the cationic and/or anionic and/or amphoteric polymer(s) forming the (a) particle in the composition according to the present invention may be from 0.01% to 15% by weight, preferably from 0.05% to 10% by weight, and more preferably from 0.1% to 5% by weight, relative to the total weight of the composition.

The non-polymeric acid having two or more pKa values or salt(s) thereof may be an organic acid or salt(s) thereof, and preferably a hydrophilic or water-soluble organic acid or salt(s) thereof, and more preferably phytic acid or salts thereof.

The amount of the non-polymeric acid having two or more pKa values or salt(s) thereof or non-polymeric base having two or more pKb values or salt(s) thereof in the composition according to the present invention may be from 0.01% to 15% by weight, preferably from 0.02% to 10% by weight, and more preferably from 0.03% to 5% by weight, relative to the total weight of the composition.

The amount of the (a) particle in the composition according to the present invention may be from 0.01% to 30% by weight, preferably from 0.05% to 20% by weight, and more preferably from 0.1% to 10% by weight, relative to the total weight of the composition.

The amount of the (b) water in the composition according to the present invention may be from 50% to 99.9% by weight, preferably from 60% to 99.8% by weight, and more preferably from 70% to 99.7% by weight, relative to the total weight of the composition.

The pH of the composition according to the present invention may be from 3 to 9, preferably from 3.3 to 8.5, and more preferably from 3.5 to 8.

The composition according to the present invention may further comprise (c) at least one oil.

The composition according to the present invention may be a cosmetic composition, preferably a skin cosmetic composition, and more preferably a skin care cosmetic composition.

A second objective of the present invention is to provide a process with which a film based on hyaluronic acid with reduced stickiness can be prepared.

The above objective of the present invention can be achieved by a process for preparing a film, preferably a cosmetic film, comprising:

applying onto a substrate, preferably a keratin substance, the composition according to the present invention; and drying the composition.

A third objective of the present invention is to provide a film based on hyaluronic acid with reduced stickiness.

The above objective of the present invention can be achieved by:
(1) A film, preferably a cosmetic film, prepared by a process comprising:
   applying onto a substrate, preferably a keratin substance, the composition according
   to the present invention; and
   drying the composition, or
(2) A film, preferably a cosmetic film, comprising:
   at least one cationic polymer and at least one anionic polymer,
   at least one cationic polymer and at least one amphoteric polymer,
   at least one anionic polymer and at least one amphoteric polymer, or
   at least one amphoteric polymer;
   at least one non-polymeric acid having two or more pKa values or salt(s) thereof or at least one non-polymeric base having two or more pKb values or salt(s) thereof; and
   optionally at least one oil,
   wherein
   the anionic polymer is selected from hyaluronic acid and derivatives thereof; and
   the amphoteric polymer is selected from cationized hyaluronic acid and salts thereof.

The present invention also relates to a cosmetic process for a keratin substance such as skin, comprising applying to the keratin substance the composition according to the present invention; and drying the composition to form a cosmetic film on the keratin substance.

BEST MODE FOR CARRYING OUT THE INVENTION

After diligent research, the inventors have discovered that it is possible to provide a composition which is capable of providing cosmetic effects based on hyaluronic acid, while reducing the stickiness due to hyaluronic acid. Thus, the composition according to the present invention comprises:
(a) at least one particle, comprising
   at least one cationic polymer and at least one anionic polymer,
   at least one cationic polymer and at least one amphoteric polymer,
   at least one anionic polymer and at least one amphoteric polymer, or
   at least one amphoteric polymer,
   and
   at least one non-polymeric acid having two or more pKa values or salt(s) thereof or
   at least one non-polymeric base having two or more pKb values or salt(s) thereof;
   and
   (b) water,
   wherein
   the anionic polymer is selected from hyaluronic acid and derivatives thereof, and
   the amphoteric polymer is selected from cationized hyaluronic acid and salts thereof.

Further, the inventors have discovered that it is possible to provide a process to prepare a film based on hyaluronic acid with reduced stickiness. Thus, the process according to the present invention is a process for preparing a film, preferably a cosmetic film, the process comprising applying onto a substrate, preferably a keratin substance, the composition according to the present invention; and drying the composition.

Furthermore, the inventors have discovered that it is possible to provide a film based on hyaluronic acid with reduced stickiness. Thus, the film according to the present invention is
(1) A film, preferably a cosmetic film, prepared by a process comprising:
   applying onto a substrate, preferably a keratin substance, the composition according
   to the present invention; and
   drying the composition, or
(2) A film, preferably a cosmetic film, comprising:
   at least one cationic polymer and at least one anionic polymer,
   at least one cationic polymer and at least one amphoteric polymer,
   at least one anionic polymer and at least one amphoteric polymer, or
   at least one amphoteric polymer;
   at least one non-polymeric acid having two or more pKa values or salt(s) thereof or
   at least one non-polymeric base having two or more pKb values or salt(s) thereof;
   and
   optionally at least one oil,
   wherein
   the anionic polymer is selected from hyaluronic acid and derivatives thereof; and
   the amphoteric polymer is selected from cationized hyaluronic acid and salts thereof.

The composition according to the present invention is stable for a long period of time. Thus, the (a) particle in the composition is stable for a long period of time. The (a) particle is stable even if it includes oil(s).

The stickiness of the composition according to the present invention can be reduced as compared to a composition including hyaluronic acid.

It is possible to easily prepare a film of a polyion complex wherein the film may include at least one oil by applying the composition onto a substrate, preferably a keratin substance such as skin and hair, and more preferably skin, and drying the composition.

The stickiness of the film according to the present invention can be reduced as compared to a film of hyaluronic acid.

The film according to the present invention may be porous. The surface of the film according to the present invention may not be flat but may have roughness.

The polyion complex film according to the present invention can have a variety of cosmetic functions. For example, the polyion complex film can provide moisturizing effects based on hyaluronic acid or cationized hyaluronic acid in the polyion complex.

The film according to the present invention is capable of capturing sebum, matting the appearance of a keratin substance such as skin, absorbing or adsorbing malodour and/or protecting the keratin substance from, for example, dirt or pollutants.

If the polyion complex includes at least one oil, the film according to the present invention may also have cosmetic effects due to the oil(s). It is also possible to realize sustained release of the oil(s) from the film.

If the polyion complex film includes at least one cosmetic active ingredient other than the oil(s), the film can also have cosmetic effects provided by the cosmetic active ingredient(s). For example, if the polyion complex film includes at least one cosmetic active ingredient selected from UV filters, anti-aging agents, anti-sebum agents, deodorant agents, anti-perspirant agents, whitening agents and a mixture thereof, the film can filter UV rays, treat the aging of the skin, absorb sebum on the skin, control odors on the skin, control the perspiration on the skin, and/or whiten the skin.

The film according to the present invention may be transparent, and therefore, may not be easy to perceive, even when the film is relatively thick.

Further, the film according to the present invention is water-resistant, and therefore, it can remain on a keratin substance such as skin even if the surface of the keratin substance is wet due to, for example, sweat and rain.

Furthermore, the film according to the present invention can be easily removed from a keratin substance such as skin under alkaline conditions. Therefore, the film according to the present invention is difficult to remove with water, while it can be easily removed with a soap which can provide alkaline conditions.

Thus, if the film according to the present invention includes a hydrophilic or water-soluble UV filter, the film according to the present invention can exhibit UV shielding effects which are resistant to water (water-proof) and can be long-lasting, but can be easily removed with a soap which can provide alkaline conditions.

Hereinafter, the composition, process, film and the like according to the present invention will be explained in a more detailed manner.

[Polyion Complex Particle]

The composition according to the present invention includes (a) at least one particle which is a polyion complex particle. Two or more different types of (a) particles may be used in combination. Thus, a single type of (a) particle or a combination of different types of (a) particles may be used.

The size of the polyion complex particle may be from 5 nm to 100 μm, preferably from 100 nm to 50 μm, more preferably from 200 nm to 40 μm, and even more preferably from 500 nm to 30 μm. A particle size less than 1 μm can be measured by a dynamic light scattering method, and a particle size more than 1 μm can be measured by an optical microscope. This particle size may be based on number average diameter.

The amount of the (a) particle(s) in the composition according to the present invention may be 0.01% by weight or more, preferably 0.05% by weight or more, and more preferably 0.1% by weight or more, relative to the total weight of the composition.

The amount of the (a) particle(s) in the composition according to the present invention may be 30% by weight or less, preferably 20% by weight or less, and more preferably 10% by weight or less, relative to the total weight of the composition.

The amount of the (a) particle(s) in the composition according to the present invention may be from 0.01% to 30% by weight, preferably from 0.05% to 20% by weight, and more preferably from 0.1% to 10% by weight, relative to the total weight of the composition.

If the composition according to the present invention includes (c) at least one oil explained below, a plurality of the (a) particles can be present at the interface between the (b) water and the (c) oil. Thus, the (a) particles can stabilize an emulsion. For example, if the (b) water constitutes a continuous phase and the (c) oil constitutes dispersed phases, the (a) particles can form an O/W emulsion which may be similar to a so-called Pickering emulsion.

Alternatively, a plurality of the (a) particles can form a capsule having a hollow. The (c) oil can be present in the hollow. In other words, the (c) oil can be incorporated into the capsule. The wall of the capsule may be composed of a continuous layer or film formed from the (a) particles. While not wishing to be bound by theory, it is believed that the (a) particles can re-organize at the interface of the (b) water and the (c) oil to spontaneously form a capsule having a hollow to include the (c) oil. For example, a continuous phase constituted with the (b) water and dispersed phases constituted with the (c) oil in the capsule can form an O/W emulsion which may also be similar to a so-called Pickering emulsion.

The above would mean that the (a) particle itself is amphiphilic and insoluble in oil or water.

The (a) particle includes at least one polymer or a combination of polymers. Specifically, the (a) particle includes:
(1) at least one cationic polymer and at least one anionic polymer;
(2) at least one cationic polymer and at least one amphoteric polymer;
(3) at least one anionic polymer and at least one amphoteric polymer; or
(4) at least one amphoteric polymer.

There is no limit to the type of the cationic polymers. Two or more different types of cationic polymers may be used in combination. Thus, a single type of cationic polymer or a combination of different types of cationic polymers may be used.

In the above (1), the ratio of the amount, for example the chemical equivalent, of the cationic polymer(s)/the anionic polymer(s) may be 0.05-18, preferably 0.1-10, and more preferably 0.5-5.0. In particular, it may be preferable that the number of the cationic groups of the cationic polymer(s)/the number of anionic groups of the anionic polymer(s) be 0.05-18, more preferably 0.1-10, and even more preferably 0.5-5.0.

In the above (2), the ratio of the amount, for example the chemical equivalent, of the cationic polymer(s)/the amphoteric polymer(s) may be 0.05-18, preferably 0.1-10, and more preferably 0.5-5.0. In particular, it may be preferable that the number of the cationic groups of the cationic polymer(s)/the number of cationic and anionic groups of the amphoteric polymer(s) be 0.05-18, more preferably 0.1-10, and even more preferably 0.5-5.0.

In the above (3), the ratio of the amount, for example the chemical equivalent, of the anionic polymer(s)/the amphoteric polymer(s) may be 0.05-18, preferably 0.1-10, and more preferably 0.5-5.0. In particular, it may be preferable that the number of the anionic groups of the anionic polymer(s)/the number of cationic and anionic groups of the amphoteric polymer(s) be 0.05-18, more preferably 0.1-10, and even more preferably 0.5-5.0.

The total amount of the polymer(s) according to any one of the above (1) to (4) in the composition according to the present invention may be 0.01% by weight or more, preferably 0.05% by weight or more, and more preferably 0.1% by weight or more, relative to the total weight of the composition.

The total amount of the polymer(s) according to any one of the above (1) to (4) in the composition according to the present invention may be 15% by weight or less, preferably 10% by weight or less, and more preferably 5% by weight or less, relative to the total weight of the composition.

The total amount of the polymer(s) according to any one of the above (1) to (4) in the composition according to the present invention may be from 0.01% to 15% by weight, preferably from 0.05% to 10% by weight, and more preferably from 0.1% to 5% by weight, relative to the total weight of the composition.

(Cationic Polymer)

A cationic polymer has a positive charge density. The charge density of the cationic polymer may be from 0.01 meq/g to 20 meq/g, preferably from 0.05 to 15 meq/g, and more preferably from 0.1 to 10 meq/g.

It may be preferable that the molecular weight of the cationic polymer be 500 or more, preferably 1000 or more, more preferably 2000 or more, and even more preferably 3000 or more.

Unless otherwise defined in the descriptions, "molecular weight" means a number average molecular weight.

The cationic polymer may have at least one positively chargeable and/or positively charged moiety selected from the group consisting of a primary, secondary or tertiary amino group, a quaternary ammonium group, a guanidine group, a biguanide group, an imidazole group, an imino group, and a pyridyl group. The term (primary) "amino group" here means a group of —$NH_2$.

The cationic polymer may be a homopolymer or a copolymer. The term "copolymer" is understood to mean both copolymers obtained from two kinds of monomers and those obtained from more than two kinds of monomers, such as terpolymers obtained from three kinds of monomers.

The cationic polymer may be selected from natural and synthetic cationic polymers. Non-limiting examples of the cationic polymers are as follows.

(1) Homopolymers and copolymers derived from acrylic or methacrylic esters and amides and comprising at least one unit chosen from units of the following formulas:

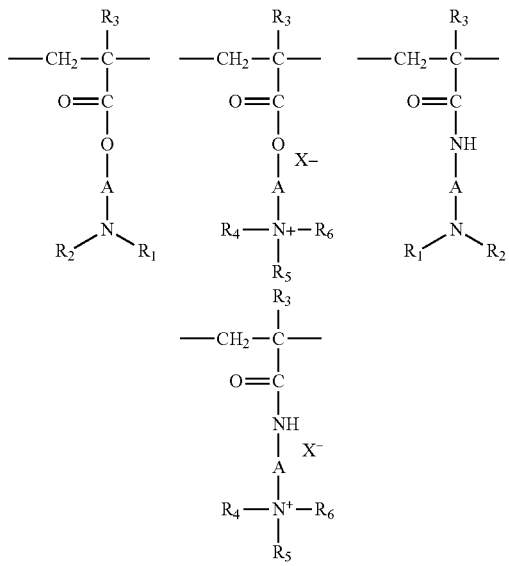

wherein:

$R_1$ and $R_2$, which may be identical or different, are chosen from hydrogen and alkyl groups comprising from 1 to 6 carbon atoms, for instance, methyl and ethyl groups;

$R_3$, which may be identical or different, is chosen from hydrogen and $CH_3$;

the symbols A, which may be identical or different, are chosen from linear or branched alkyl groups comprising from 1 to 6 carbon atoms, for example, from 2 to 3 carbon atoms and hydroxyalkyl groups comprising from 1 to 4 carbon atoms;

$R_4$, $R_5$, and $R_6$, which may be identical or different, are chosen from alkyl groups comprising from 1 to 18 carbon atoms and benzyl groups, and in at least one embodiment, alkyl groups comprising from 1 to 6 carbon atoms; and X is an anion derived from an inorganic or organic acid, such as methosulphate anions and halides, for instance chloride and bromide.

The copolymers of family (1) may also comprise at least one unit derived from comonomers which may be chosen from acrylamides, methacrylamides, diacetone acrylamides, acrylamides and methacrylamides substituted on the nitrogen atom with ($C_1$-$C_4$) lower alkyl groups, groups derived from acrylic or methacrylic acids and esters thereof, vinyllactams such as vinylpyrrolidone and vinylcaprolactam, and vinyl esters.

Examples of copolymers of family (1) include, but are not limited to:

copolymers of acrylamide and of dimethylaminoethyl methacrylate quaternized with dimethyl sulphate or with a dimethyl halide, copolymers of acrylamide and of methacryloyloxyethyltrimethylammonium chloride described, for example, in European Patent Application No. 0 080 976, copolymers of acrylamide and of methacryloyloxyethyltrimethylammonium methosulphate, quaternized or nonquaternized vinylpyrrolidone/dialkylaminoalkyl acrylate or methacrylate copolymers, described, for example, in French Patent Nos. 2 077 143 and 2 393 573, dimethylaminoethyl methacrylate/vinylcaprolactam/vinylpyrrolidone terpolymers, vinylpyrrolidone/methacrylamidopropyldimethylamine copolymers, quaternized vinylpyrrolidone/dimethylaminopropylmethacrylamide copolymers, and crosslinked methacryloyloxy($C_1$-$C_4$)alkyltri($C_1$-$C_4$)alkylammonium salt polymers such as the polymers obtained by homopolymerization of dimethylaminoethyl methacrylate quaternized with methyl chloride, or by copolymerization of acrylamide with dimethylaminoethyl methacrylate quaternized with methyl chloride, the homopolymerization or copolymerization being followed by crosslinking with a compound containing an olefinic unsaturation, for example, methylenebisacrylamide.

(2) Cationic cellulose polymers such as cellulose ether derivatives comprising one or more quaternary ammonium groups described, for example, in French Patent No. 1 492 597, such as the polymers sold under the names "JR" (JR 400, JR 125, JR 30M) or "LR" (LR 400, LR 30M) by the company Union Carbide Corporation. These polymers are also defined in the CTFA dictionary as quaternary ammoniums of hydroxyethylcellulose that have reacted with an epoxide substituted with a trimethylammonium group.

It is preferable that the cationic cellulose polymer have at least one quaternary ammonium group, preferably a quaternary trialkyl ammonium group, and more preferably a quaternary trimethyl ammonium group.

The quaternary ammonium group may be present in a quaternary ammonium group-containing group which may be represented by the following chemical formula (I):

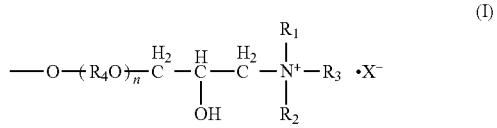

(I)

wherein
each of $R_1$ and $R_2$ denotes a $C_{1-3}$ alkyl group, preferably a methyl or ethyl group, and more preferably a methyl group,
$R_3$ denotes a $C_{1-24}$ alkyl group, preferably a methyl or ethyl group, and more preferably methyl group,
X− denotes an anion, preferably a halide, and more preferably a chloride, n denotes an integer from 0-30, preferably 0-10, and more preferably 0, and
$R_4$ denotes a $C_{1-4}$ alkylene group, preferably an ethylene or propylene group.

The leftmost ether bond (—O—) in the above chemical formula (I) can attach to the sugar ring of the polysaccharide.

It is preferable that the quaternary ammonium group-containing group be —O—CH$_2$—CH(OH)—CH$_2$—N$^+$(CH$_3$)$_3$.

(3) Cationic cellulose polymers such as cellulose copolymers and cellulose derivatives grafted with a water-soluble monomer of quaternary ammonium, and described, for example, in U.S. Pat. No. 4,131,576, such as hydroxyalkylcelluloses, for instance, hydroxymethyl-, hydroxyethyl-, and hydroxypropylcelluloses grafted, for example, with a salt chosen from methacryloylethyltrimethylammonium, methacrylamidopropyltrimethylammonium, and dimethyldiallylammonium salts.

Commercial products corresponding to these polymers include, for example, the products sold under the name "Celquat® L 200" and "Celquat® H 100" by the company National Starch.

(4) Non-cellulose-based cationic polysaccharides described in U.S. Pat. Nos. 3,589,578 and 4,031,307, such as guar gums comprising cationic trialkylammonium groups, cationic hyaluronic acid, and dextran hydroxypropyl trimonium chloride. Guar gums modified with a salt, for example the chloride, of 2,3-epoxypropyltrimethylammonium (guar hydroxypropyltrimonium chloride) may also be used.

Such products are sold, for instance, under the trade names JAGUAR® C13 S, JAGUAR® C15, JAGUAR® C17, and JAGUAR® C162 by the company MEYHALL.

(5) Polymers comprising piperazinyl units and divalent alkylene or hydroxyalkylene groups comprising straight or branched chains, optionally interrupted with at least one entity chosen from oxygen, sulphur, nitrogen, aromatic rings, and heterocyclic rings, and also the oxidation and/or quaternization products of these polymers. Such polymers are described, for example, in French Patent Nos. 2 162 025 and 2 280 361.

(6) Water-soluble polyamino amides prepared, for example, by polycondensation of an acidic compound with a polyamine; these polyamino amides possibly being cross-linked with an entity chosen from epihalohydrins; diepoxides; dianhydrides; unsaturated dianhydrides; bisunsaturated derivatives; bishalohydrins; bisazetidiniums; bishaloacyidiamines; bisalkyl halides; oligomers resulting from the reaction of a difunctional compound which is reactive with an entity chosen from bishalohydrins, bisazetidiniums, bishaloacyldiamines, bisalkyl halides, epihalohydrins, diepoxides, and bisunsaturated derivatives; the crosslinking agent being used in an amount ranging from 0.025 to 0.35 mol per amine group of the polyamino amide; these polyamino amides optionally being alkylated or, if they comprise at least one tertiary amine function, they may be quaternized. Such polymers are described, for example, in French Patent Nos. 2 252 840 and 2 368 508.

(7) Polyamino amide derivatives resulting from the condensation of polyalkylene polyamines with polycarboxylic acids, followed by alkylation with difunctional agents, for example, adipic acid/dialkylaminohydroxyalkyldialkylenetriamine polymers in which the alkyl group comprises from 1 to 4 carbon atoms, such as methyl, ethyl, and propyl groups, and the alkylene group comprises from 1 to 4 carbon atoms, such as an ethylene group. Such polymers are described, for instance, in French Patent No. 1 583 363. In at least one embodiment, these derivatives may be chosen from adipic acid/dimethylaminohydroxypropyldiethylenetriamine polymers.

(8) Polymers obtained by reaction of a polyalkylene polyamine comprising two primary amine groups and at least one secondary amine group, with a dicarboxylic acid chosen from diglycolic acid and saturated aliphatic dicarboxylic acids comprising from 3 to 8 carbon atoms. The molar ratio of the polyalkylene polyamine to the dicarboxylic acid may range from 0.8:1 to 1.4:1; the polyamino amide resulting therefrom being reacted with epichlorohydrin in a molar ratio of epichlorohydrin relative to the secondary amine group of the polyamino amide ranging from 0.5:1 to 1.8:1. Such polymers are described, for example, in U.S. Pat. Nos. 3,227,615 and 2,961,347.

(9) Cyclopolymers of alkyldiallylamine and cyclopolymers of dialkyldiallyl-ammonium, such as homopolymers and copolymers comprising, as the main constituent of the chain, at least one unit chosen from units of formulas (Ia) and (Ib):

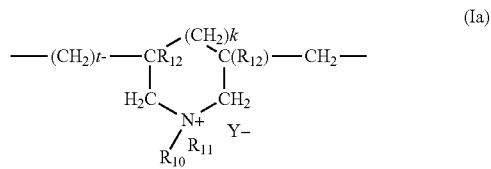

(Ia)

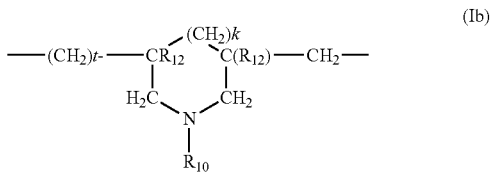

(Ib)

wherein:
k and t, which may be identical or different, are equal to 0 or 1, the sum k+t being equal to 1; $R_{12}$ is chosen from hydrogen and methyl groups;
$R_{10}$ and $R_{11}$, which may be identical or different, are chosen from alkyl groups comprising from 1 to 6 carbon atoms, hydroxyalkyl groups in which the alkyl group comprises, for example, from 1 to 5 carbon atoms, and lower ($C_1$-$C_4$)amidoalkyl groups, or $R_{10}$ and $R_{11}$ may form, together with the nitrogen atom to which they are attached, heterocyclic groups such as piperidinyl and morpholinyl; and Y' is an anion such as bromide, chloride, acetate, borate, citrate, tartrate, bisulphate, bisulphite, sulphate, and phosphate. These polymers are described, for example, in French Patent No. 2 080 759 and in its Certificate of Addition 2 190 406.

In one embodiment, $R_{10}$ and $R_{11}$, which may be identical or different, are chosen from alkyl groups comprising from 1 to 4 carbon atoms.

Examples of such polymers include, but are not limited to, (co)polydiallyldialkyl ammonium chloride such as the dimethyldiallylammonium chloride homopolymer sold under the name "MERQUAT® 100" by the company CALGON (and its homologues of low weight-average molecular mass) and the copolymers of diallyldimethylammonium chloride and of acrylamide sold under the name "MERQUAT® 550".

Quaternary diammonium polymers comprising at least one repeating unit of formula (II):

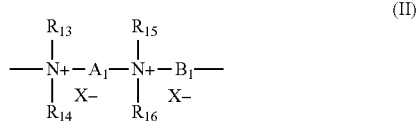

wherein:

$R_{13}$, $R_{14}$, $R_{15}$, and $R_{16}$, which may be identical or different, are chosen from aliphatic, alicyclic, and arylaliphatic groups comprising from 1 to 20 carbon atoms and lower hydroxyalkyl aliphatic groups, or alternatively $R_{13}$, $R_{14}$, $R_{15}$, and $R_{16}$ may form, together or separately, with the nitrogen atoms to which they are attached, heterocycles optionally comprising a second heteroatom other than nitrogen, or alternatively $R_{13}$, $R_{14}$, $R_{15}$, and $R_{16}$, which may be identical or different, are chosen from linear or branched $C_1$-$C_6$ alkyl groups substituted with at least one group chosen from nitrile groups, ester groups, acyl groups, amide groups, —CO—O—$R_{17}$-E groups, and —CO—NH—$R_{17}$-E groups, wherein $R_{17}$ is an alkylene group and E is a quaternary ammonium group;

$A_1$ and $B_1$, which may be identical or different, are chosen from polymethylene groups comprising from 2 to 20 carbon atoms, which may be linear or branched, saturated or unsaturated, and which may comprise, linked or intercalated in the main chain, at least one entity chosen from aromatic rings, oxygen, sulphur, sulphoxide groups, sulphone groups, disulphide groups, amino groups, alkylamino groups, hydroxyl groups, quaternary ammonium groups, ureido groups, amide groups, and ester groups, and X⁻ is an anion derived from an inorganic or organic acid;

$A_1$, $R_{13}$, and $R_{15}$ may form, together with the two nitrogen atoms to which they are attached, a piperazine ring;

if $A_1$ is chosen from linear or branched, saturated or unsaturated alkylene or hydroxyalkylene groups, $B_1$ may be chosen from:

—(CH$_2$)$_n$—CO—E'—OC—(CH$_2$)$_n$— wherein E' is chosen from:

a) glycol residues of formula —O—Z—O—, wherein Z is chosen from linear or branched hydrocarbon-based groups and groups of the following formulas:

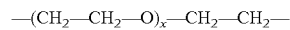

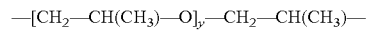

wherein x and y, which may be identical or different, are chosen from integers ranging from 1 to 4, which represent a defined and unique degree of polymerization, and numbers ranging from 1 to 4, which represent an average degree of polymerization;

b) bis-secondary diamine residue such as piperazine derivatives;

c) bis-primary diamine residues of formula —NH—Y—NH—, wherein Y is chosen from linear or branched hydrocarbon-based groups and the divalent group —CH$_2$—CH$_2$—S—S—CH$_2$—CH$_2$—; and d) ureylene groups of formula —NH—CO—NH—.

In at least one embodiment, X⁻ is an anion such as chloride or bromide.

Polymers of this type are described, for example, in French Patent Nos. 2 320 330; 2 270 846; 2 316 271; 2 336 434; and 2 413 907 and U.S. Pat. Nos. 2,273,780; 2,375,853; 2,388,614; 2,454,547; 3,206,462; 2,261,002; 2,271,378; 3,874,870; 4,001,432; 3,929,990; 3,966,904; 4,005,193; 4,025,617; 4,025,627; 4,025,653; 4,026,945; and 4,027,020.

Non-limiting examples of such polymers include those comprising at least one repeating unit of formula (III):

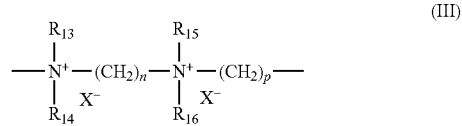

wherein $R_{13}$, $R_{14}$, $R_{15}$, and $R_{16}$, which may be identical or different, are chosen from alkyl and hydroxyalkyl groups comprising from 1 to 4 carbon atoms, n and p, which may be identical or different, are integers ranging from 2 to 20, and X⁻ is an anion derived from an inorganic or organic acid.

(11) Polyquaternary ammonium polymers comprising units of formula (IV):

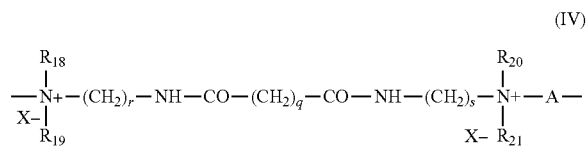

wherein:

$R_{18}$, $R_{19}$, $R_{20}$, and $R_{21}$, which may be identical or different, are chosen from hydrogen, methyl groups, ethyl groups, propyl groups, 3-hydroxyethyl groups, β-hydroxypropyl groups, —CH$_2$CH$_2$(OCH$_2$CH$_2$)$_p$OH groups, wherein p is chosen from integers ranging from 0 to 6, with the proviso that $R_{18}$, $R_{19}$, $R_{20}$, and $R_{21}$ are not simultaneously hydrogen, r and s, which may be identical or different, are chosen from integers ranging from 1 to 6, q is chosen from integers ranging from 0 to 34, X⁻ is an anion such as a halide, and A is chosen from radicals of dihalides and —CH$_2$—CH$_2$—O—CH$_2$—CH$_2$—.

Such compounds are described, for instance, in European Patent Application No. 0 122 324.

(12) Quaternary polymers of vinylpyrrolidone and of vinylimidazole.

Other examples of suitable cationic polymers include, but are not limited to, cationic proteins and cationic protein hydrolysates, polyalkyleneimines, such as polyethyleneimines, polymers comprising units chosen from vinylpyridine and vinylpyridinium units, condensates of polyamines and of epichlorohydrin, quaternary polyureylenes, and chitin derivatives.

According to one embodiment of the present invention, the at least one cationic polymer is chosen from cellulose ether derivatives comprising quaternary ammonium groups, such as the products sold under the name "JR 400" by the company UNION CARBIDE CORPORATION, cationic cyclopolymers, for instance, the homo-polymers and copolymers of dimethyldiallylammonium chloride sold under the names MERQUAT® 100, MERQUAT® 550, and MERQUAT® S by the company CALGON, guar gums modified with a 2,3-epoxypropyltrimethylammonium salt, and quaternary polymers of vinylpyrrolidone and of vinylimidazole.

(13) Polyamines

As the cationic polymer, it is also possible to use (co)polyamines, which may be homopolymers or copolymers, with a plurality of amino groups. The amino group may be a primary, secondary, tertiary or quaternary amino group. The amino group may be present in a polymer backbone or a pendent group, if present, of the (co)polyamines.

As an example of the (co)polyamines, mention may be made of chitosan, (co)polyallylamines, (co)polyvinylamines, (co)polyanilines, (co)polyvinylimidazoles, (co)polydimethylaminoethylenemethacrylates, (co)polyvinylpyridines such as (co)poly-1-methyl-2-vinylpyridines, (co)polyimines such as (co)polyethyleneimines, (co)polypyridines such as (co)poly(quaternary pyridines), (co)polybiguanides such as (co)polyaminopropyl biguanides, (co)polylysines, (co)polyornithines, (co)polyarginines, (co)polyhistidines, aminodextrans, aminocelluloses, amino(co)polyvinylacetals, and salts thereof.

As the (co)polyamines, it is preferable to use (co)polylysines. Polylysine is well known. Polylysine can be a natural homopolymer of L-lysine that can be produced by bacterial fermentation. For example, polylysine can be ε-Poly-L-lysine, typically used as a natural preservative in food products. Polylysine is a polyelectrolyte which is soluble in polar solvents such as water, propylene glycol and glycerol. Polylysine is commercially available in various forms, such as poly D-lysine and poly L-lysine. Polylysine can be in salt and/or solution form.

(14) Cationic Polyaminoacids

As the cationic polymer, it may be possible use cationic polyaminoacids, which may be cationic homopolymers or copolymers, with a plurality of amino groups and carboxyl groups. The amino group may be a primary, secondary, tertiary or quaternary amino group. The amino group may be present in a polymer backbone or a pendent group, if present, of the cationic polyaminoacids. The carboxyl group may be present in a pendent group, if present, of the cationic polyaminoacids.

As examples of the cationic polyaminoacids, mention may be made of cationized collagen, cationized gelatin, steardimoium hydroxyprolyl hydrolyzed wheat protein, cocodimonium hydroxypropyl hydrolyzed wheat protein, hydroxypropyltrimonium hydrolyzed conchiolin protein, steardimonium hydroxypropyl hydrolyzed soy protein, hydroxypropyltrimonium hydrolyzed soy protein, cocodimonium hydroxypropyl hydrolyzed soy protein, and the like.

The following descriptions relate to preferable embodiments of the cationic polymer.

It may be preferable that the cationic polymer be selected from cationic starches.

As examples of the cationic starches, mention may be made of starches modified with a 2,3-epoxypropyltrimethylammonium salt (e.g. chloride), such as the product known as starch hydroxypropyltrimonium chloride according to the INCI nomenclature and sold under the name SENSOMER CI-50 from Ondeo or Pencare™ DP 1015 from Ingredion.

It may also be preferable that the cationic polymer be selected from cationic gums.

The gums may be, for example, selected from the group consisting of *cassia* gum, karaya gum, konjac gum, gum tragacanth, tara gum, acacia gum and gum arabic.

Examples of cationic gum include cationic polygalactomannan derivatives such as guar gum derivatives and cassia gum derivatives, e.g., CTFA: Guar Hydroxypropyltrimonium Chloride, Hydroxypropyl Guar Hydroxypropyltrimonium Chloride, and *Cassia* Hydroxypropyltrimonium Chloride. Guar hydroxypropyltrimonium chloride is commercially available under the Jaguar™ trade name series from Rhodia Inc. and the N-Hance trade name series from Ashland Inc. *Cassia* Hydroxypropyltrimonium Chloride is commercially available under the Sensomer™ CT-250 and Sensomer™ CT-400 trademarks from Lubrizol Advanced Materials, Inc or the ClearHance™ from Ashland Inc.

It may also be preferable that the cationic polymer be selected from chitosans.

It may be more preferable that the cationic polymer be selected from the group consisting of cyclopolymers of alkyldiallylamine and cyclopolymers of dialkyldiallylammonium such as (co)polydiallyldialkyl ammonium chloride, (co)polyamines such as (co)polylysines, cationic (co)polyaminoacids such as cationized collagen, cationic cellulose polymers, and salts thereof.

It may be even more preferable that the cationic polymer be selected from the group consisting of polyquaternium-4, polyquaternium-10, polyquaternium-24, polyquaternium-67, starch hydroxypropyl trimonium chloride, *cassia* hydroxypropyltrimonium chloride, chitosan, and a mixture thereof.

The amount of the cationic polymer(s) in the composition according to the present invention may be 0.01% by weight or more, preferably 0.05% by weight or more, and more preferably 0.1% by weight or more, relative to the total weight of the composition.

The amount of the cationic polymer(s) in the composition according to the present invention may be 15% by weight or less, preferably 10% by weight or less, and more preferably 5% by weight or less, relative to the total weight of the composition.

The amount of the cationic polymer(s) in the composition according to the present invention may be from 0.01% to 15% by weight, preferably from 0.05% to 10% by weight, and more preferably from 0.1% to 5% by weight, relative to the total weight of the composition.

(Anionic Polymer)

An anionic polymer has a positive charge density. The charge density of the anionic polymer may be from 0.1 meq/g to 20 meq/g, preferably from 1 to 15 meq/g, and more preferably from 4 to 10 meq/g if the anionic polymer is a synthetic anionic polymer, and the average substitution degree of the anionic polymer may be from 0.1 to 3.0, preferably from 0.2 to 2.7, and more preferably from 0.3 to 2.5 if the anionic polymer is a natural anionic polymer.

It may be preferable that the molecular weight of the anionic polymer be 300 or more, preferably 1,000 or more, even more preferably 5,000 or more, even more preferably 10,000 or more, even more preferably 50,000 or more, even more preferably 100,000 or more, and even more preferably 1,000,000 or more.

Unless otherwise defined in the descriptions, "molecular weight" may mean a number average molecular weight.

According to the present invention, the anionic polymer is selected from hyaluronic acid and derivatives thereof.

Hyaluronic acid can be represented by the following chemical formula.

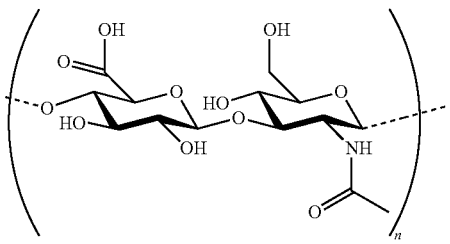

In the context of the present invention, the term "hyaluronic acid" covers in particular the basic unit of hyaluronic acid of formula:

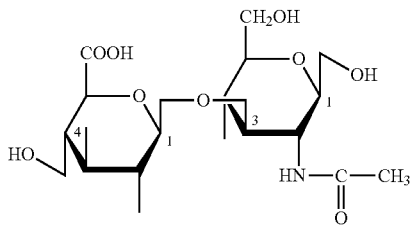

It is the smallest fraction of hyaluronic acid comprising a disaccharide dimer, namely D-glucuronic acid and N-acetylglucosamine.

The term "hyaluronic acid and derivatives thereof" also comprises, in the context of the present invention, the linear polymer comprising the polymeric unit described above, linked together in the chain via alternating β(1,4) and β(1,3) glycosidic linkages, having a molecular weight (MW) that can range between 380 and 13 000 000 daltons. This molecular weight depends in large part on the source from which the hyaluronic acid is obtained and/or on the preparation methods.

The term "hyaluronic acid and derivatives thereof" also comprises, in the context of the present invention, the hyaluronic acid salts. As the salts, mention may be made of alkaline metal salts such as sodium salts and potassium salts, alkaline earth metal salts such as magnesium salts, ammonium salts, and mixtures thereof.

In the natural state, hyaluronic acid is present in pericellular gels, in the base substance of the connective tissues of vertebrate organs such as the dermis and epithelial tissues, and in particular in the epidermis, in the synovial fluid of the joints, in the vitreous humor, in the human umbilical cord and in the *Crista galli apophysis*.

Thus, the term "hyaluronic acid and derivatives thereof" comprises all the fractions or subunits of hyaluronic acid having a molecular weight in particular within the molecular weight range recalled above.

In the context of the present invention, hyaluronic acid fractions which do not have an inflammatory activity are preferably used.

By way of illustration of the various hyaluronic acid fractions, reference may be made to the document "Hyaluronan fragments: an information-rich system", R. Stern et al., European Journal of Cell Biology 58 (2006) 699-715, which reviews the listed biological activities of hyaluronic acid according to its molecular weight.

According to a preferred embodiment of the present invention, the hyaluronic acid fractions suitable for the use covered by the present invention have a molecular weight of between 50 000 and 5 000 000, in particular between 100 000 and 5 000 000, especially between 400 000 and 5 000 000 Da. In this case, the term used is high-molecular-weight hyaluronic acid.

Alternatively, the hyaluronic acid fractions that may also be suitable for the use covered by the present invention have a molecular weight of between 50 000 and 400 000 Da. In this case, the term used is intermediate-molecular-weight hyaluronic acid.

Alternatively again, the hyaluronic acid fractions that may be suitable for the use covered by the present invention have a molecular weight of less than 50 000 Da. In this case, the term used is low-molecular-weight hyaluronic acid.

Finally, the term "hyaluronic acid and derivatives thereof" also comprises hyaluronic acid esters in particular those in which all or some of the carboxylic groups of the acid functions are esterified with oxyethylenated alkyls or alcohols, containing from 1 to 20 carbon atoms, in particular with a degree of substitution at the level of the D-glucuronic acid of the hyaluronic acid ranging from 0.5 to 50%.

Mention may in particular be made of methyl, ethyl, n-propyl, n-pentyl, benzyl and dodecyl esters of hyaluronic acid. Such esters have in particular been described in D. Campoccia et al. "Semisynthetic resorbable materials from hyaluronan esterification", Biomaterials 19 (1998) 2101-2127.

The hyaluronic acid derivative may be, for example, acetylated hyaluronic acid or a salt thereof.

The molecular weights indicated above are also valid for the hyaluronic acid esters.

Hyaluronic acid may in particular be hyaluronic acid supplied by the company Hyactive under the trade name CPN (MW: 10 to 150 kDa), by the company Soliance under the trade name Cristalhyal (MW: 1.1.times.10$^6$), by the company Bioland under the name Nutra HA (MW: 820 000 Da), by the company Bioland under the name Nutra AF (MW: 69 000 Da), by the company Bioland under the name Oligo HA (MW: 6100 Da) or else by the company Vam Farmacos Metica under the name D Factor (MW: 380 Da).

The amount of the anionic polymer(s) in the composition according to the present invention may be 0.01% by weight or more, preferably 0.05% by weight or more, and more preferably 0.1% by weight or more, relative to the total weight of the composition.

The amount of the anionic polymer(s) in the composition according to the present invention may be 15% by weight or less, preferably 10% by weight or less, and more preferably 5% by weight or less, relative to the total weight of the composition.

The amount of the anionic polymer(s) in the composition according to the present invention may be from 0.01% to 15% by weight, preferably from 0.05% to 10% by weight, and more preferably from 0.1% to 5% by weight, relative to the total weight of the composition.

(Amphoteric Polymer)

An amphoteric polymer has both a positive charge density and a negative charge density.

The positive charge density of the amphoteric polymer may be from 0.01 meq/g to 20 meq/g, preferably from 0.05 to 15 meq/g, and more preferably from 0.1 to 10 meq/g.

The negative charge density of the amphoteric polymer may be from 0.01 meq/g to 20 meq/g, preferably from 0.05 to 15 meq/g, and more preferably from 0.1 to 10 meq/g.

It may be preferable that the molecular weight of the amphoteric polymer be 500 or more, preferably 1,000 or more, more preferably 10,000 or more, and even more preferably 100,000 or more.

It may be preferable that the molecular weight of the amphoteric polymer be 1,000,000 or less, preferably 900,000 or less, and more preferably 800,000 or less.

Unless otherwise defined in the descriptions, "molecular weight" may mean a number average molecular weight.

According to the present invention, the amphoteric polymer is selected from cationized hyaluronic acid and salts thereof.

The cationized hyaluronic acid comprises at least one cationic group, such as an ammonium group, in the molecule thereof. The cationic group does not indicate a counter cation of the salt, because the counter cation is not in the molecule of hyaluronic acid.

As the salts, mention may be made of alkaline metal salts such as sodium salt, alkaline earth metal salts such as magnesium salts, ammonium salts, and mixtures thereof.

The cationized hyaluronic acid may have at least one quaternary ammonium group-containing group.

The cationized hyaluronic acid and/or a salt thereof may have a structure shown by the following general formula (1):

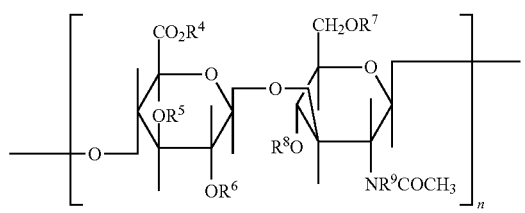

(1)

wherein $R^4$ to $R^9$ individually represent a hydrogen atom or a quaternary ammonium group-containing group (excluding a case where all of $R^4$ to $R^9$ represent hydrogen atoms), and n represents an integer from 2 to 5,000.

Examples of the quaternary ammonium group-containing group represented by $R^4$ to $R^9$ in the above general formula (1) include groups shown by the following general formula (2):

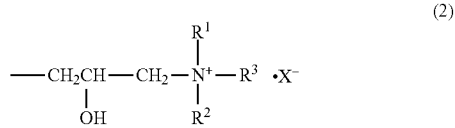

(2)

wherein $R^1$ to $R^3$ individually represent hydrocarbon groups, and
$X^-$ represents a monovalent anion.

Examples of the hydrocarbon groups represented by $R^1$ to $R^3$ in the above general formula (2) include a linear or branched alkyl group, an unsaturated hydrocarbon group, and an aromatic hydrocarbon group. Among these, the alkyl group is preferable. Examples of the alkyl group include alkyl groups having 1 to 30 (preferably 1 to 6) carbon atoms. It is more preferable that the hydrocarbon groups represented by $R^1$ to $R^3$ be alkyl groups having 1 to 3 carbon atoms.

Examples of the monovalent anion represented by $X^-$ in the above general formula (2) include a halogen ion such as a fluorine ion, a bromine ion, a chlorine ion, and an iodine ion.

The quaternary ammonium group-containing group may be introduced by replacing the hydrogen atom of the carboxyl group included in hyaluronic acid and/or a salt thereof used as a raw material (hereinafter may be referred to as "raw material hyaluronic acid and/or a salt thereof") with the quaternary ammonium group-containing group. In this case, the quaternary ammonium group-containing group is bonded to the oxygen atom of the group (—C(—O)O—) included in the cationized hyaluronic acid and/or a salt thereof according to this embodiment. The fact that the quaternary ammonium group-containing group is bonded to the oxygen atom of the group (—C(—O)O—) included in the cationized hyaluronic acid and/or a salt thereof according to this embodiment may be confirmed by the presence of a peak attributed to the carbon atom of the (—C(—O)O— group to which the quaternary ammonium group-containing group is bonded via the oxygen atom, determined by analyzing the chemical shift of the nuclear magnetic resonance ($^{13}$C NMR) spectrum.

Specifically, the quaternary ammonium group-containing group may be obtained by reacting the carboxyl group (and/or hydroxyl group) of the raw material hyaluronic acid and/or a salt thereof with a cationizing agent that contains a quaternary ammonium group. It is preferable that the cationizing agent is at least one of a 2,3-epoxypropyltrialkylammonium halide shown by the following general formula (3) and a 3-halogeno-2-hydroxypropyltrialkylammonium halide shown by the following general formula (4). The reaction of the raw material hyaluronic acid and/or a salt thereof with the cationizing agent is described in the production method hereinafter.

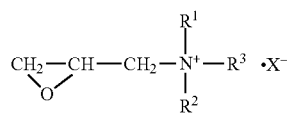

(3)

wherein
R¹ to R³ are the same as defined for the general formula (2), and X represents a halogen atom.

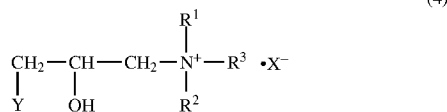

(4)

wherein
R¹ to R³ are the same as defined for the general formula (2), and X and Y individually represent halogen atoms.

Examples of the halogen atoms represented by X and Y in the above general formulas (3) and (4) include a fluorine atom, a bromine atom, a chlorine atom, and an iodine atom.

The cationized hyaluronic acid may have at least one quaternary ammonium group-containing group and has a degree of cationization of from 0.05 to 0.6, preferably from 0.1 to 0.5, and more preferably from 0.15 to 0.4.

The degree of cationization (i.e., the degree of substitution with the quaternary ammonium group-containing group) of the cationized hyaluronic acid and/or a salt thereof according to this embodiment may be determined by calculating the nitrogen content of raw material sodium hyaluronate and the nitrogen content of the cationized hyaluronic acid by the semi-micro Kjeldahl method, and calculating the degree of cationization by the following expression based on the increase in the nitrogen content.

When the nitrogen content of the raw material sodium hyaluronate is referred to as $N_N$ (%) and the nitrogen content of the cationized hyaluronic acid having a degree of cationization of (x) is referred to as $N_S$ (%), the relationship between the increase in the nitrogen content ($N_S-N_N$) and the degree of cationization (x) is shown by the following expression.

$$N_S - N_N(\%) = \frac{[14x/(\text{molecular weight of disaccharide unit of cationized hyaluronic acid})] \times 100}$$
$$= [14x/(\text{molecular weight of disaccharide unit of raw material sodium hyaluronate}) + 129.5x] \times 100$$
$$= [14x/(401.3 + 129.5x)] \times 100$$

Therefore, the degree of cationization (i.e., the degree of substitution with the quaternary ammonium group-containing group) can be calculated by the following expression.
Degree of cationization(x)=[($N_S-N_N$)×401.3]/[1400−129.5*($N_S-N_N$)]

The degree of cationization of a cationized hyaluronic acid when a raw material hyaluronic acid is unknown may be calculated by the above expression on the assumption that the raw material sodium hyaluronate is sodium hyaluronate having a purity of 99% or more.

It is possible that 1% or more, preferably 5% or more, and more preferably 10% or more and/or 50% or less, preferably 40% or less and more preferably 30% or less of the anionic groups in hyaluronic acid be replaced with a cationic group, preferably a quaternary ammonium group-containing group, and more preferably the quaternary ammonium group-containing group represented by the above general formula (2).

As the cationized hyaluronic acid, mention may be made of hydroxypropyltrimonium hyaluronate marketed as Hyaloveil and Hyaloveul-MPF by Kewpie in Japan.

The amount of the amphoteric polymer(s) in the composition according to the present invention may be 0.01% by weight or more, preferably 0.05% by weight or more, and more preferably 0.1% by weight or more, relative to the total weight of the composition.

The amount of the amphoteric polymer(s) in the composition according to the present invention may be 15% by weight or less, preferably 10% by weight or less, and more preferably 5% by weight or less, relative to the total weight of the composition.

The amount of the amphoteric polymer(s) in the composition according to the present invention may be from 0.01% to 15% by weight, preferably from 0.05% to 10% by weight, and more preferably from 0.1% to 5% by weight, relative to the total weight of the composition.

(Non-Polymeric Acid Having Two or More Acid Dissociation Constants)

The composition according to the present invention may include at least one non-polymeric acid having two or more pKa values or salt(s) thereof, i.e., at least one non-polymeric acid having two or more acid dissociation constants or salt(s) thereof. The pKa value (acid dissociation constant) is well known to those skilled in the art, and should be determined at a constant temperature such as 25° C.

The non-polymeric acid having two or more pKa values or salt(s) thereof can be included in the (a) particle. The non-polymeric acid having two or more pKa values can function as a crosslinker for the anionic polymer and/or the amphoteric polymer.

The term "non-polymeric" here means that the acid is not obtained by polymerizing two or more monomers. Therefore, the non-polymeric acid does not correspond to an acid obtained by polymerizing two or more monomers such as polycarboxylic acid.

It is preferable that the molecular weight of the non-polymeric acid having two or more pKa values or salt(s) thereof is 1000 or less, preferably 800 or less, and more preferably 700 or less.

There is no limit to the type of the non-polymeric acid having two or more pKa values or salt(s) thereof. Two or more different types of non-polymeric acids having two or more pKa values or salts thereof may be used in combination. Thus, a single type of a non-polymeric acid having two or more pKa values or a salt thereof or a combination of different types of non-polymeric acids having two or more pKa values or salts thereof may be used.

The term "salt" here means a salt formed by addition of suitable base(s) to the non-polymeric acid having two or more pKa values, which may be obtained from a reaction with the non-polymeric acid having two or more pKa values with the base(s) according to methods known to those skilled in the art. As the salt, mention may be made of metal salts, for example salts with alkaline metal such as Na and K, and salts with alkaline earth metal such as Mg and Ca, and ammonium salts.

The non-polymeric acid having two or more pKa values or salt(s) thereof may be an organic acid or salt(s) thereof; and preferably a hydrophilic or water-soluble organic acid or salt(s) thereof.

The non-polymeric acid having two or more pKa values may have at least two acid groups selected from the group consisting of a carboxylic group, a sulfuric group, a sulfonic group, a phosphoric group, a phosphonic group, a phenolic hydroxyl group, and a mixture thereof.

The non-polymeric acid having two or more pKa values may be a non-polymeric polyvalent acid.

The non-polymeric acid having two or more pKa values may be selected from the group consisting of dicarboxylic acids, disulfonic acids, and diphosphoric acids, and a mixture thereof.

The non-polymeric acid having two or more pKa values or salt(s) thereof may be selected from the group consisting of oxalic acid, malonic acid, succinic acid, glutaric acid, adipic acid, pimelic acid, suberic acid, azelaic acid, sebacic acid, fumaric acid, maleic acid, malic acid, citric acid, aconitic acid, oxaloacetic acid, tartaric acid, and salts thereof; aspartic acid, glutamic acid, and salts thereof; terephthalylidene dicamphor sulfonic acid or salts thereof (Mexoryl SX), Benzophenone-9; phytic acid, and salts thereof; Red 2 (Amaranth), Red 102 (New Coccine), Yellow 5 (Tartrazine), Yellow 6 (Sunset Yellow FCF), Green 3 (Fast Green FCF), Blue 1 (Brilliant Blue FCF), Blue 2 (Indigo Carmine), Red 201 (Lithol Rubine B), Red 202 (Lithol Rubine BCA), Red 204 (Lake Red CBA), Red 206 (Lithol Red CA), Red 207 (Lithol Red BA), Red 208 (Lithol Red SR), Red 219 (Brilliant Lake Red R), Red 220 (Deep Maroon), Red 227 (Fast Acid Magenta), Yellow 203 (Quinoline Yellow WS), Green 201 (Alizanine Cyanine Green F), Green 204 (Pyranine Conc), Green 205 (Light Green SF Yellowish), Blue 203 (Patent Blue CA), Blue 205 (Alfazurine FG), Red 401 (Violamine R), Red 405 (Permanent Re F5R), Red 502 (Ponceau 3R), Red 503 (Ponceau R), Red 504 (Ponceau SX), Green 401 (Naphtol Green B), Green 402 (Guinea Green B), and Black 401 (Naphtol Blue Black); folic acid, ascorbic acid, erythorbic acid, and salts thereof; cystine and salts thereof; EDTA and salts thereof; glycyrrhizin and salts thereof; and a mixture thereof.

It may be preferable that the non-polymeric acid having two or more pKa values or salt(s) thereof be selected from the group consisting of terephthalylidene dicamphor sulfonic acid and salts thereof (Mexoryl SX), Yellow 6 (Sunset Yellow FCF), ascorbic acid, phytic acid and salts thereof, and a mixture thereof.

The amount of the non-polymeric acid having two or more pKa values or salt(s) thereof in the composition according to the present invention may be 0.01% by weight or more, preferably 0.02% by weight or more, and more preferably 0.03% by weight or more, relative to the total weight of the composition.

The amount of the non-polymeric acid having two or more pKa values or salt(s) thereof in the composition according to the present invention may be 15% by weight or less, preferably 10% by weight or less, and more preferably 5% by weight or less, relative to the total weight of the composition.

The amount of the non-polymeric acid having two or more pKa values or salt(s) thereof in the composition according to the present invention may be from 0.01% to 15% by weight, preferably from 0.02% to 10% by weight, and more preferably from 0.03% to 5% by weight, relative to the total weight of the composition.

(Non-Polymeric Base Having Two or More Base Dissociation Constants)

The composition according to the present invention may include at least one non-polymeric base having two or more pKb values or salt(s) thereof, i.e., at least one non-polymeric base having two or more base dissociation constants or salt(s) thereof. The pKb value (base dissociation constant) is well known to those skilled in the art, and should be determined at a constant temperature such as 25° C.

The non-polymeric base having two or more pKb values or salt(s) thereof can be included in the (a) particle. The non-polymeric base having two or more pKb values can function as a crosslinker for the cationic polymer and/or the amphoteric polymers.

The term "non-polymeric" here means that the base is not obtained by polymerizing two or more monomers. Therefore, the non-polymeric base does not correspond to a base obtained by polymerizing two or more monomers such as polyallylamine.

It is preferable that the molecular weight of the non-polymeric base having two or more pKb values or salt(s) thereof be 1000 or less, preferably 800 or less, and more preferably 700 or less.

There is no limit to the type of the non-polymeric base having two or more pKb values or salt(s) thereof. Two or more different types of non-polymeric bases having two or more pKb values or salts thereof may be used in combination. Thus, a single type of a non-polymeric base having two or more pKb values or a salt thereof or a combination of different types of non-polymeric bases having two or more pKb values or salts thereof may be used.

The term "salt" here means a salt formed by addition of suitable acid(s) to the non-polymeric base having two or more pKb values, which may be obtained from a reaction with the non-polymeric base having two or more pKb values with the acid(s) according to methods known to those skilled in the art. As the salt, mention may be made of ammonium salts, for example salts with inorganic acid such as HCl and $HNO_3$, and salts with organic acid such as carboxylic acids and sulfonic acids.

The non-polymeric base having two or more pKb values or salt(s) thereof may be an organic base or salt(s) thereof, and preferably a hydrophilic or water-soluble organic base or salt(s) thereof.

The non-polymeric base having two or more pKb values may have at least two basic groups selected from the group consisting of an amino group, a guanidine group, a biguanide group, an imidazole group, an imino group, a pyridyl group and a mixture thereof.

The non-polymeric base having two or more pKb values may be selected from the group consisting of non-polymeric diamines such as ethylenediamine, propylenediamine, pentanediamine, hexanediamine, urea and derivatives thereof and guanidine and derivatives thereof, non-polymeric polyamines such as spermine and spermidine, basic amino acids, and a mixture thereof.

The non-polymeric base having two or more pKb values or salt(s) thereof may be selected from the group consisting of arginine, lysine, histidine, cysteine, cystine, tyrosine, tryptophan, ornithine, and a mixture thereof.

It may be preferable that the non-polymeric base having two or more pKb values or salt(s) thereof be selected from the group consisting of arginine, lysine, histidine, and a mixture thereof.

The amount of the non-polymeric base having two or more pKb values or salt(s) thereof in the composition according to the present invention may be 0.01% by weight or more, preferably 0.02% by weight or more, and more preferably 0.03% by weight or more, relative to the total weight of the composition.

The amount of the non-polymeric base having two or more pKb values or salt(s) thereof in the composition according to the present invention may be 15% by weight or less, preferably 10% by weight or less, and more preferably 5% by weight or less, relative to the total weight of the composition.

The amount of the non-polymeric base having two or more pKb values or salt(s) thereof in the composition according to the present invention may be from 0.01% to 15% by weight, preferably from 0.02% to 10% by weight, and more preferably from 0.03% to 5% by weight, relative to the total weight of the composition.

[Water]

The composition according to the present invention comprises (b) water.

The amount of the (b) water may be 50% by weight or more, preferably 60% by weight or more, and more preferably 70% by weight or more, relative to the total weight of the composition.

The amount of the (b) water may be 99.9% by weight or less, preferably 99.8% by weight or less, and more preferably 99.7% by weight or less, relative to the total weight of the composition.

The amount of the (b) water may be from 50 to 99.9% by weight, preferably from 60 to 99.8% by weight, and more preferably from 70 to 99.7% by weight, relative to the total weight of the composition.

[pH]

The pH of the composition according to the present invention may be from 3 to 9, preferably from 3.3 to 8.5, and more preferably from 3.5 to 8.

At a pH of from 3 to 9, the (a) particle can be very stable.

The pH of the composition according to the present invention may be adjusted by adding at least one alkaline agent and/or at least one acid, other than the non-polymeric acid having two or more pKa values or salt(s) thereof or non-polymeric base having two or more pKb values or salt(s) thereof to be incorporated into the (a) particle. The pH of the composition according to the present invention may also be adjusted by adding at least one buffering agent.

(Alkaline Agent)

The composition according to the present invention may comprise at least one alkaline agent. Two or more alkaline agents may be used in combination. Thus, a single type of alkaline agent or a combination of different types of alkaline agents may be used.

The alkaline agent may be an inorganic alkaline agent. It is preferable that the inorganic alkaline agent be selected from the group consisting of ammonia; alkaline metal hydroxides; alkaline earth metal hydroxides; alkaline metal phosphates and monohydrogenophosphates such as sodium phosphate or sodium monohydrogen phosphate.

As examples of the inorganic alkaline metal hydroxides, mention may be made of sodium hydroxide and potassium hydroxide. As examples of the alkaline earth metal hydroxides, mention may be made of calcium hydroxide and magnesium hydroxide. As an inorganic alkaline agent, sodium hydroxide is preferable.

The alkaline agent may be an organic alkaline agent. It is preferable that the organic alkaline agent be selected from the group consisting of monoamines and derivatives thereof; diamines and derivatives thereof; polyamines and derivatives thereof; basic amino acids and derivatives thereof; oligomers of basic amino acids and derivatives thereof; polymers of basic amino acids and derivatives thereof; urea and derivatives thereof; and guanidine and derivatives thereof.

As examples of the organic alkaline agents, mention may be made of alkanolamines such as mono-, di- and tri-ethanolamine, and isopropanolamine; urea, guanidine and their derivatives; basic amino acids such as lysine, ornithine or arginine; and diamines such as those described in the structure below:

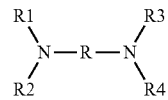

wherein R denotes an alkylene such as propylene optionally substituted by a hydroxyl or a $C_1$-$C_4$ alkyl radical, and $R_1$, $R_2$, $R_3$ and $R_4$ independently denote a hydrogen atom, an alkyl radical or a $C_1$—$C_4$ hydroxyalkyl radical, which may be exemplified by 1,3-propanediamine and derivatives thereof. Arginine, urea and monoethanolamine are preferable.

The alkaline agent(s) may be used in a total amount of from 0.01% to 15% by weight, preferably from 0.02% to 10% by weight, more preferably from 0.03% to 5% by weight, relative to the total weight of the composition, depending on their solubility.

(Acid)

The composition according to the present invention may comprise at least one acid. Two or more acids may be used in combination. Thus, a single type of acid or a combination of different types of acids may be used.

As the acid, mention may be made of any inorganic or organic acids, preferably inorganic acids, which are commonly used in cosmetic products. A monovalent acid and/or a polyvalent acid may be used. A monovalent acid such as citric acid, lactic acid, sulfuric acid, phosphoric acid and hydrochloric acid (HCl) may be used. HCl is preferable.

The acid(s) may be used in a total amount of from 0.01% to 15% by weight, preferably from 0.02% to 10% by weight, more preferably from 0.03% to 5% by weight, relative to the total weight of the composition, depending on their solubility.

(Buffering Agent)

The composition according to the present invention may comprise at least one buffering agent. Two or more buffering agents may be used in combination. Thus, a single type of buffering agent or a combination of different types of buffering agents may be used.

As the buffering agent, mention may be made of an acetate buffer (for example, acetic acid+sodium acetate), a phosphate buffer (for example, sodium dihydrogen phosphate+di-sodium hydrogen phosphate), a citrate buffer (for example, citric acid+sodium citrate), a borate buffer (for example, boric acid+sodium borate), a tartrate buffer (for example, tartaric acid+sodium tartrate dihydrate), Tris buffer (for example, tris(hydroxymethyl)aminomethane), and a Hepes buffer (4-(2-hydroxyethyl)-1-piperazineethanesulfonic acid).

[Oil]

The composition according to the present invention may comprise (c) at least one oil. If two or more (c) oils are used, they may be the same or different.

Here, "oil" means a fatty compound or substance which is in the form of a liquid or a paste (non-solid) at room temperature (25° C.) under atmospheric pressure (760 mmHg). As the oils, those generally used in cosmetics can be used alone or in combination thereof. These oils may be volatile or non-volatile.

The oil may be a non-polar oil such as a hydrocarbon oil, a silicone oil, or the like; a polar oil such as a plant or animal oil and an ester oil or an ether oil; or a mixture thereof.

The oil may be selected from the group consisting of oils of plant or animal origin, synthetic oils, silicone oils, hydrocarbon oils and fatty alcohols.

As examples of plant oils, mention may be made of, for example, apricot oil, linseed oil, camellia oil, macadamia nut oil, corn oil, mink oil, olive oil, avocado oil, sasanqua oil, castor oil, safflower oil, jojoba oil, sunflower oil, almond oil, rapeseed oil, sesame oil, soybean oil, peanut oil, and mixtures thereof.

As examples of animal oils, mention may be made of, for example, squalene and squalane.

As examples of synthetic oils, mention may be made of alkane oils such as isododecane and isohexadecane, ester oils, ether oils, and artificial triglycerides.

The ester oils are preferably liquid esters of saturated or unsaturated, linear or branched $C_1$-$C_{26}$ aliphatic monoacids or polyacids and of saturated or unsaturated, linear or branched $C_1$-$C_{26}$ aliphatic monoalcohols or polyalcohols, the total number of carbon atoms of the esters being greater than or equal to 10.

Preferably, for the esters of monoalcohols, at least one from among the alcohol and the acid from which the esters of the present invention are derived is branched.

Among the monoesters of monoacids and of monoalcohols, mention may be made of ethyl palmitate, ethyl hexyl palmitate, isopropyl palmitate, dicaprylyl carbonate, alkyl myristates such as isopropyl myristate or ethyl myristate, isocetyl stearate, 2-ethylhexyl isononanoate, isononyl isononanoate, isodecyl neopentanoate and isostearyl neopentanoate.

Esters of $C_4$-$C_{22}$ dicarboxylic or tricarboxylic acids and of $C_1$-$C_{22}$ alcohols, and esters of monocarboxylic, dicarboxylic or tricarboxylic acids and of non-sugar $C_4$-$C_{26}$ dihydroxy, trihydroxy, tetrahydroxy or pentahydroxy alcohols may also be used.

Mention may especially be made of: diethyl sebacate; isopropyl lauroyl sarcosinate; diisopropyl sebacate; bis(2-ethylhexyl) sebacate; diisopropyl adipate; di-n-propyl adipate; dioctyl adipate; bis(2-ethylhexyl) adipate; diisostearyl adipate; bis(2-ethylhexyl) maleate; triisopropyl citrate; triisocetyl citrate; triisostearyl citrate; glyceryl trilactate; glyceryl trioctanoate; trioctyldodecyl citrate; trioleyl citrate; neopentyl glycol diheptanoate; diethylene glycol diisononanoate.

As ester oils, one can use sugar esters and diesters of $C_6$-$C_{30}$ and preferably $C_{12}$-$C_{22}$ fatty acids. It is recalled that the term "sugar" means oxygen-bearing hydrocarbon-based compounds containing several alcohol functions, with or without aldehyde or ketone functions, and which comprise at least 4 carbon atoms. These sugars may be monosaccharides, oligosaccharides or polysaccharides.

Examples of suitable sugars that may be mentioned include sucrose (or saccharose), glucose, galactose, ribose, fucose, maltose, fructose, mannose, arabinose, xylose and lactose, and derivatives thereof, especially alkyl derivatives, such as methyl derivatives, for instance methylglucose.

The sugar esters of fatty acids may be chosen especially from the group comprising the esters or mixtures of esters of sugars described previously and of linear or branched, saturated or unsaturated $C_6$-$C_{30}$ and preferably $C_{12}$-$C_{22}$ fatty acids. If they are unsaturated, these compounds may have one to three conjugated or non-conjugated carbon-carbon double bonds.

The esters according to this variant may also be selected from monoesters, diesters, triesters, tetraesters and polyesters, and mixtures thereof.

These esters may be, for example, oleates, laurates, palmitates, myristates, behenates, cocoates, stearates, linoleates, linolenates, caprates and arachidonates, or mixtures thereof such as, especially, oleopalmitate, oleostearate and palmitostearate mixed esters, as well as pentaerythrityl tetraethyl hexanoate.

More particularly, use is made of monoesters and diesters and especially sucrose, glucose or methylglucose monooleates or dioleates, stearates, behenates, oleopalmitates, linoleates, linolenates and oleostearates.

An example that may be mentioned is the product sold under the name Glucate® DO by the company Amerchol, which is a methylglucose dioleate.

As examples of preferable ester oils, mention may be made of, for example, diisopropyl adipate, dioctyl adipate, 2-ethylhexyl hexanoate, ethyl laurate, cetyl octanoate, octyldodecyl octanoate, isodecyl neopentanoate, myristyl propionate, 2-ethylhexyl 2-ethylhexanoate, 2-ethylhexyl octanoate, 2-ethylhexyl caprylate/caprate, methyl palmitate, ethyl palmitate, isopropyl palmitate, dicaprylyl carbonate, isopropyl lauroyl sarcosinate, isononyl isononanoate, ethylhexyl palmitate, isohexyl laurate, hexyl laurate, isocetyl stearate, isopropyl isostearate, isopropyl myristate, isodecyl oleate, glyceryl tri(2-ethylhexanoate), pentaerythrityl tetra(2-ethylhexanoate), 2-ethylhexyl succinate, diethyl sebacate, and mixtures thereof.

As examples of artificial triglycerides, mention may be made of, for example, capryl caprylyl glycerides, glyceryl trimyristate, glyceryl tripalmitate, glyceryl trilinolenate, glyceryl trilaurate, glyceryl tricaprate, glyceryl tricaprylate, glyceryl tri(caprate/caprylate) and glyceryl tri(caprate/caprylate/linolenate).

As examples of silicone oils, mention may be made of, for example, linear organopolysiloxanes such as dimethylpolysiloxane, methylphenylpolysiloxane, methylhydrogenpolysiloxane, and the like; cyclic organopolysiloxanes such as cyclohexasiloxane, octamethylcyclotetrasiloxane, decamethylcyclopentasiloxane, dodecamethylcyclohexasiloxane, and the like; and mixtures thereof.

Preferably, silicone oil is chosen from liquid polydialkylsiloxanes, especially liquid polydimethylsiloxanes (PDMS) and liquid polyorganosiloxanes comprising at least one aryl group.

These silicone oils may also be organomodified. The organomodified silicones that can be used according to the present invention are silicone oils as defined above and comprise in their structure one or more organofunctional groups attached via a hydrocarbon-based group.

Organopolysiloxanes are defined in greater detail in Walter Noll's Chemistry and Technology of Silicones (1968), Academic Press. They may be volatile or non-volatile.

When they are volatile, the silicones are more particularly chosen from those having a boiling point of between 60° C. and 260° C., and even more particularly from:
(i) Cyclic polydialkylsiloxanes comprising from 3 to 7 and preferably 4 to 5 silicon atoms. These are, for example, octamethylcyclotetrasiloxane sold in particular under the name Volatile Silicone® 7207 by Union Carbide or Silbione® 70045 V2 by Rhodia, decamethylcyclopentasiloxane sold under the name Volatile Silicone® 7158 by Union Carbide, Silbione® 70045 V5 by Rhodia, and dodecamethylcyclopentasiloxane sold under the name Silsoft 1217 by Momentive Performance Materials, and mixtures thereof. Mention may also be made of cyclocopolymers of the type such as dimethylsiloxane/methylalkylsiloxane, such as Silicone Volatile® FZ 3109 sold by the company Union Carbide, of formula:

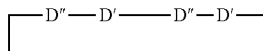

Among the silicones containing aryl groups, mention may be made of polydiarylsiloxanes, especially polydiphenylsiloxanes and polyalkylarylsiloxanes such as phenyl silicone oil.

The phenyl silicone oil may be chosen from the phenyl silicones of the following formula:

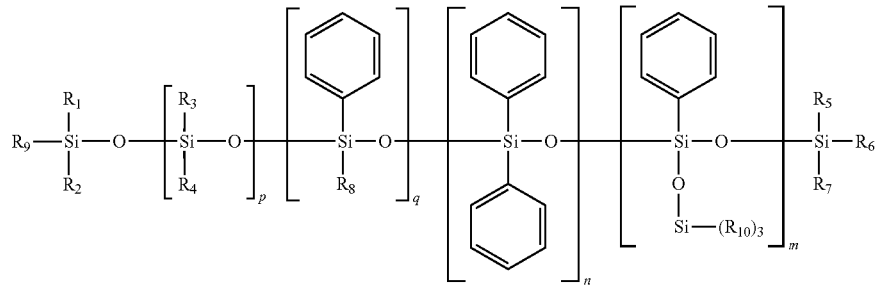

-continued

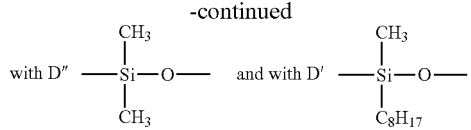

Mention may also be made of mixtures of cyclic polydialkylsiloxanes with organosilicon compounds, such as the mixture of octamethylcyclotetrasiloxane and tetratrimethylsilylpentaerythritol (50/50) and the mixture of octamethylcyclotetrasiloxane and oxy-1,1'-bis(2,2,2', 2',3,3'-hexatrimethylsilyloxy)neopentane; and (ii) Linear volatile polydialkylsiloxanes containing 2 to 9 silicon atoms and having a viscosity of less than or equal to $5 \times 10^{-6}$ m$^2$/s at 25° C. An example is decamethyltetrasiloxane sold in particular under the name SH 200 by the company Toray Silicone. Silicones belonging to this category are also described in the article published in Cosmetics and Toiletries, Vol. 91, January 76, pp. 27-32, Todd & Byers, Volatile Silicone Fluids for Cosmetics. The viscosity of the silicones is measured at 25° C. according to ASTM standard 445 Appendix C.

Non-volatile polydialkylsiloxanes may also be used. These non-volatile silicones are more particularly chosen from polydialkylsiloxanes, among which mention may be made mainly of polydimethylsiloxanes containing trimethylsilyl end groups.

Among these polydialkylsiloxanes, mention may be made, in a non-limiting manner, of the following commercial products:

the Silbione® oils of the 47 and 70 047 series or the Mirasil® oils sold by Rhodia, for instance the oil 70 047 V 500 000;

the oils of the Mirasil® series sold by the company Rhodia;

the oils of the 200 series from the company Dow Corning, such as DC200 with a viscosity of 60,000 mm$^2$/s; and the Viscasil® oils from General Electric and certain oils of the SF series (SF 96, SF 18) from General Electric.

Mention may also be made of polydimethylsiloxanes containing dimethylsilanol end groups known under the name dimethiconol (CTFA), such as the oils of the 48 series from the company Rhodia.

in which $R_1$ to $R_{10}$, independently of each other, are saturated or unsaturated, linear, cyclic or branched $C_1$-$C_{30}$ hydrocarbon-based radicals, preferably $C_1$-$C_{12}$ hydrocarbon-based radicals, and more preferably $C_1$-$C_6$ hydrocarbon-based radicals, in particular methyl, ethyl, propyl or butyl radicals, and m, n, p and q are, independently of each other, integers 0 to 900 inclusive, preferably 0 to 500 inclusive, and more preferably 0 to 100 inclusive, with the proviso that the sum n+m+q is not 0.

Examples that may be mentioned include the products sold under the following names:

the Silbione® oils of the 70 641 series from Rhodia;

the oils of the Rhodorsil® 70 633 and 763 series from Rhodia;

the oil Dow Corning 556 Cosmetic Grade Fluid from Dow Corning;

the silicones of the PK series from Bayer, such as the product PK20;

certain oils of the SF series from General Electric, such as SF 1023, SF 1154, SF 1250 and SF 1265.

As the phenyl silicone oil, phenyl trimethicone ($R_1$ to $R_{10}$ are methyl; p, q, and n=0; m=1 in the above formula) is preferable.

The organomodified liquid silicones may especially contain polyethyleneoxy and/or polypropyleneoxy groups. Mention may thus be made of the silicone KF-6017 proposed by Shin-Etsu, and the oils Silwet® L722 and L77 from the company Union Carbide.

Hydrocarbon oils may be chosen from:

linear or branched, optionally cyclic, $C_6$-$C_{16}$ lower alkanes. Examples that may be mentioned include hexane, undecane, dodecane, tridecane, and isoparaffins, for instance isohexadecane, isododecane and isodecane; and linear or branched hydrocarbons containing more than 16 carbon atoms, such as liquid paraffins, liquid petroleum jelly, polydecenes and hydrogenated polyisobutenes such as Parleam®, and squalane.

As preferable examples of hydrocarbon oils, mention may be made of, for example, linear or branched hydrocarbons such as isohexadecane, isododecane, squalane, mineral oil (e.g., liquid paraffin), paraffin, vaseline or petrolatum, naphthalenes, and the like; hydrogenated polyisobutene, isoeicosan, and decene/butene copolymer; and mixtures thereof.

The term "fatty" in the fatty alcohol means the inclusion of a relatively large number of carbon atoms. Thus, alcohols which have 4 or more, preferably 6 or more, and more preferably 12 or more carbon atoms are encompassed within the scope of fatty alcohols. The fatty alcohol may be saturated or unsaturated. The fatty alcohol may be linear or branched.

The fatty alcohol may have the structure R—OH wherein R is chosen from saturated and unsaturated, linear and branched radicals containing from 4 to 40 carbon atoms, preferably from 6 to 30 carbon atoms, and more preferably from 12 to 20 carbon atoms. In at least one embodiment, R may be chosen from $C_{12}$-$C_{20}$ alkyl and $C_{12}$-$C_{20}$ alkenyl groups. R may or may not be substituted with at least one hydroxyl group.

As examples of the fatty alcohol, mention may be made of lauryl alcohol, cetyl alcohol, stearyl alcohol, isostearyl alcohol, behenyl alcohol, undecylenyl alcohol, myristyl alcohol, octyldodecanol, hexyldecanol, oleyl alcohol, linoleyl alcohol, palmitoleyl alcohol, arachidonyl alcohol, erucyl alcohol, and mixtures thereof.

It is preferable that the fatty alcohol be a saturated fatty alcohol.

Thus, the fatty alcohol may be selected from straight or branched, saturated or unsaturated $C_6$-$C_{30}$ alcohols, preferably straight or branched, saturated $C_6$-$C_{30}$ alcohols, and more preferably straight or branched, saturated $C_{12}$-$C_{20}$ alcohols.

The term "saturated fatty alcohol" here means an alcohol having a long aliphatic saturated carbon chain. It is preferable that the saturated fatty alcohol be selected from any linear or branched, saturated $C_6$-$C_{30}$ fatty alcohols. Among the linear or branched, saturated $C_6$-$C_{30}$ fatty alcohols, linear or branched, saturated $C_{12}$-$C_{20}$ fatty alcohols may preferably be used. Any linear or branched, saturated $C_{16}$-$C_{20}$ fatty alcohols may be more preferably used. Branched $C_{16}$-$C_{20}$ fatty alcohols may be even more preferably used.

As examples of saturated fatty alcohols, mention may be made of lauryl alcohol, cetyl alcohol, stearyl alcohol, isostearyl alcohol, behenyl alcohol, undecylenyl alcohol, myristyl alcohol, octyldodecanol, hexyldecanol, and mixtures thereof. In one embodiment, cetyl alcohol, stearyl alcohol, octyldodecanol, hexyldecanol, or a mixture thereof (e.g., cetearyl alcohol) as well as behenyl alcohol, can be used as a saturated fatty alcohol.

According to at least one embodiment, the fatty alcohol used in the composition according to the present invention is preferably chosen from octyldodecanol, hexyldecanol and mixtures thereof.

According to the present invention, the (c) oil may be surrounded by a plurality of the (a) particles or the (c) oil may be present in the hollow of a capsule formed by the (a) particles.

In other words, the (c) oil may be covered by the (a) particles, or a capsule formed by the (a) particles includes the (c) oil in the hollow of the capsule.

The (c) oil which is surrounded by the (a) particles or present in the hollow of the capsule formed by the (a) particles cannot directly make contact with a keratin substance such as skin. Thus, even if the (c) oil has a sticky or greasy feeling of use, the composition according to the present invention will not provide a sticky or greasy feeling of use.

The amount of the (c) oil(s) in the composition according to the present invention may be 0.01% by weight or more, preferably 0.05% by weight or more, and more preferably 0.1% by weight or more, relative to the total weight of the composition.

The amount of the (c) oil(s) in the composition according to the present invention may be 50% by weight or less, preferably 40% by weight or less, and more preferably 30% by weight or less, relative to the total weight of the composition.

The amount of the (c) oil(s) in the composition according to the present invention may be from 0.01% to 50% by weight, preferably from 0.05% to 40% by weight, and more preferably from 0.1% to 30% by weight, relative to the total weight of the composition.

[Optional Additives]

The composition according to the present invention may comprise, in addition to the aforementioned components, components typically employed in cosmetics, specifically, surfactants or emulsifiers, hydrophilic or lipophilic thickeners, organic volatile or non-volatile solvents, silicones and silicone derivatives other than the (c) oil, natural extracts derived from animals or vegetables, waxes, and the like, within a range which does not impair the effects of the present invention.

The composition according to the present invention may comprise the above optional additive(s) in an amount of from 0.01% to 50% by weight, preferably from 0.05% to 30% by weight, and more preferably from 0.1% to 10% by weight, relative to the total weight of the composition.

However, it is preferable that the composition according to the present invention include a very limited amount of surfactant(s) or emulsifier(s). The amount of the surfactant(s) or emulsifier(s) in the composition according to the present invention may be 1% by weight or less, preferably 0.1% by weight or less, and more preferably 0.01% by weight or less, relative to the total weight of the composition. It is in particular preferable that the composition according to the present invention include no surfactant or emulsifier.

[Composition]

The composition according to the present invention may be intended to be used as a cosmetic composition. Thus, the cosmetic composition according to the present invention may be intended for application onto a keratin substance. Keratin substance here means a material containing keratin as a main constituent element, and examples thereof include the skin, scalp, nails, lips, hair, and the like. Thus, it is preferable that the cosmetic composition according to the present invention be used for a cosmetic process for the keratin substance, in particular skin.

Thus, the cosmetic composition according to the present invention may be a skin cosmetic composition, preferably a skin care composition or a skin makeup composition, and more preferably a skin care composition.

The composition according to the present invention can be prepared by mixing the above essential and optional ingredients in accordance with any of the processes which are well known to those skilled in the art.

The composition according to the present invention can be prepared by simple or easy mixing with a conventional mixing means such as a stirrer. Thus, strong shearing by, for example, a homogenizer is not necessary. Also, heating is not necessary.

If the composition according to the present invention includes the (c) oil(s), it can be in the form of an emulsion, an O/W emulsion or a W/0 emulsion. It is preferable that the composition according to the present invention be in the form of an O/W emulsion, because it can provide a fresh sensation due to the (b) water which forms the outer phase thereof.

It is more preferable that the amount of the surfactant(s) or emulsifier(s) in the emulsion, in particular an O/W emulsion, be 3% by weight or less, preferably 2% by weight or less, and more preferably 1% by weight or less, relative to the total weight of the composition, because the surfactant (s) may negatively affect water-resistance. It is in particular preferable that the emulsion, in particular an O/W emulsion include no surfactant or emulsifier.

[Film]

The composition according to the present invention can be used for easily preparing a film. The (a) particles can aggregate and integrate into a continuous film.

Thus, the present invention also relates to a process for preparing a film, preferably a cosmetic film, optionally with a thickness of preferably more than 0.1 µm, more preferably 1.5 µm or more, and even more preferably 2 µm or more, comprising:

applying onto a substrate, preferably a keratin substance, more preferably skin, the composition according to the present invention; and
drying the composition.

The upper limit of the thickness of the film according to the present invention is not limited. Thus, for example, the thickness of the film according to the present invention may be 1 mm or less, preferably 500 µm or less, more preferably 300 µm or less, and even more preferably 100 µm or less.

Since the process for preparing a film according to the present invention includes the steps of applying the composition according to the present invention onto a substrate, preferably a keratin substance, and more preferably skin, and of drying the composition, the process according to the present invention does not require any spin coating or spraying, and therefore, it is possible to easily prepare even a relatively thick film. Thus, the process for preparing a film according to present invention can prepare a relatively thick film without any special equipment such as spin coaters and spraying machines.

Even if the film according to the present invention is relatively thick, it is still thin and may be transparent, and therefore, may not be easy to perceive. Thus, the film according to the present invention can be used preferably as a cosmetic film.

If the substrate is not a keratin substance such as skin, the composition according to the present invention may be applied onto a substrate made from any material other than keratin. The materials of the non-keratinous substrate are not limited. Two or more materials may be used in combination. Thus, a single type of material or a combination of different types of materials may be used. In any event, it is preferable that the substrate be flexible or elastic.

If the substrate is not a keratin substance, it is preferable that the substrate be water-soluble, because it is possible to leave the film according to the present invention by washing the substrate with water. As examples of the water-soluble materials, mention may be made of poly(meth) acrylic acids, polyethyleneglycols, polyacrylamides, polyvinylalcohol (PVA), starch, celluloseacetates, and the like. PVA is preferable.

If the non-keratinous substrate is in the form of a sheet, it may have a thickness of more than that of the film according to the present invention, in order to ease the handling of the film attached to the substrate sheet. The thickness of the non-keratinous substrate sheet is not limited, but may be from 1 µm to 5 mm, preferably from 10 µm to 1 mm, and more preferably from 50 to 500 µm.

It is more preferable that the film according to the present invention be releasable from the non-keratinous substrate. The mode of release is not limited. Therefore, the film according to the present invention may be peeled from the non-keratinous substrate, or released by the dissolution of the substrate sheet into a solvent such as water.

The present invention also relates to:

(1) A film, preferably a cosmetic film, optionally with a thickness of preferably more than 0.1 µm, more preferably 1.5 µm or more, and even more preferably 2 µm or more, prepared by a process comprising:
   applying onto a substrate, preferably a keratin substance, and more preferably skin, the composition according to the present invention; and
   drying the composition,
and (2) A film, preferably a cosmetic film, optionally with a thickness of preferably more than 0.1 µm, more preferably 1.5 µm or more, and even more preferably 2 µm or more, comprising:
   at least one cationic polymer and at least one anionic polymer,
   at least one cationic polymer and at least one amphoteric polymer,
   at least one anionic polymer and at least one amphoteric polymer, or
   at least one amphoteric polymer;
   at least one non-polymeric acid having two or more pKa values or salt(s) thereof or
   at least one non-polymeric base having two or more pKb values or salt(s) thereof, and
   optionally at least one oil,
   wherein
   the anionic polymer is selected from hyaluronic acid and salts thereof; and
   the amphoteric polymer is selected from cationized hyaluronic acid and salts thereof.

The above explanations regarding the cationic, anionic and amphoteric polymers as well as the above oil can apply to those in the above films (1) and (2).

The film thus obtained above can be self-standing. The term "self-standing" here means that the film can be in the form of a sheet and can be handled as an independent sheet without the assistance of a substrate or support. Thus, the term "self-standing" may have the same meaning as "self-supporting".

It is preferable that the film according to the present invention be hydrophobic.

The term "hydrophobic" in the present specification means that the solubility of the polymer in water (preferably with a volume of 1 liter) at from 20 to 40° C., preferably from 25 to 40° C., and more preferably from 30 to 40° C. is less than 10% by weight, preferably less than 5% by weight, more preferably less than 1% by weight, and even more preferably less than 0.1% by weight, relative to the total weight of the polymer. It is most preferable that the polymer is not soluble in water.

If the film according to the present invention is hydrophobic, the film can have water-resistant properties, and therefore, it can remain on a keratin substance such as skin even if the surface of the keratin substance is wet due to, for example, sweat and rain. Thus, when the film according to the present invention provides any cosmetic effect, the cosmetic effect can last a long time.

On the other hand, the film according to the present invention can be easily removed from a keratin substance such as skin under alkaline conditions such as a pH of from 8 to 12, preferably from 9 to 11. Therefore, the film according to the present invention is difficult to remove with water, while it can be easily removed with a soap which can provide such alkaline conditions.

The film according to the present invention may comprise at least one biocompatible and/or biodegradable polymer layer. Two or more biocompatible and/or biodegradable polymers may be used in combination. Thus, a single type of biocompatible and/or biodegradable polymer or a combination of different types of biocompatible and/or biodegradable polymers may be used.

The term "biocompatible" polymer in the present specification means that the polymer does not have excess interaction between the polymer and cells in the living body including the skin, and the polymer is not recognized by the living body as a foreign material.

The term "biodegradable" polymer in the present specification means that the polymer can be degraded or decomposed in a living body due to, for example, the metabolism of the living body itself or the metabolism of the microorganisms which may be present in the living body. Also, the biodegradable polymer can be degraded by hydrolysis.

If the film according to the present invention includes a biocompatible and/or biodegradable polymer, it is less irritable or not irritable to the skin, and does not cause any rash. In addition, due to the use of a biocompatible and/or biodegradable polymer, the cosmetic sheet according to the present invention can adhere well to the skin.

The film according to the present invention can be used for cosmetic treatments of keratin substances, preferably skin, in particular the face. The film according to the present invention can be in any shape or form. For example, it can be used as a full-face mask sheet, or a patch for a part of the face such as the cheek, nose, and around the eyes.

If the film according to the present invention includes at least one hydrophilic or water-soluble UV filter, it can provide UV shielding effects derived from the hydrophilic or water-soluble UV filter. Normally, a hydrophilic or water-soluble UV filter can be removed from the surface of a keratinous substrate such as skin by water such as sweat and rain. However, since the hydrophilic or water-soluble UV filter is included in the film according to the present invention, it is difficult for the hydrophilic or water-soluble UV filter to be removed by water, thereby resulting in long-lasting UV shielding effects.

[Cosmetic Process and Use]

The present invention also relates to:

a cosmetic process for a keratin substance such as skin, comprising: applying to the keratin substance the composition according to the present invention; and drying the composition to form a cosmetic film on the keratin substance; and a use of the composition according to the present invention for the preparation of a cosmetic film on a keratin substance such as skin.

The cosmetic process here means a non-therapeutic cosmetic method for caring for and/or making up the surface of a keratin substance such as skin.

In both the above process and use, the above cosmetic film is resistant to water with a pH of 7 or less, and is removable with water with a pH of more than 7, preferably 8 or more, and more preferably 9 or more.

In other words, the above cosmetic film can be water-resistant under neutral or acidic conditions such as a pH of 7 or less, preferably in a range of 6 or more and 7 or less, and more preferably in a range of 5 or more and 7 or less, while the above cosmetic film can be removed under alkaline conditions such as a pH of more than 7, preferably 8 or more, and more preferably 9 or more. The upper limit of the pH is preferably 13, more preferably 12, and even more preferably 11.

Accordingly, the above cosmetic film can be water-resistant, and therefore, it can remain on a keratin substance such as skin even if the surface of the keratin substance is wet due to, for example, sweat and rain. On the other hand, the above cosmetic film can be easily removed from a keratin substance such as skin under alkaline conditions. Therefore, the film according to the present invention is difficult to remove with water, while it can be easily removed with a soap which can provide alkaline conditions.

If the above cosmetic film includes a UV filter which may be present in the composition according to the present invention, the above cosmetic film can protect a keratin substance such as skin from UV rays, thereby limiting the darkening of the skin, improving the colour and uniformity of the complexion, and/or treating aging of the skin.

Furthermore, the above cosmetic film may have cosmetic effects such as capturing sebum, matting the appearance of a keratin substrate such as skin, absorbing or adsorbing malodour, and/or protecting the keratin substance from, for example, dirt or pollutant, due to the properties of the polyion complex particles in the cosmetic film, even if the cosmetic film does not include any cosmetic active ingredient.

In addition, the above cosmetic film may immediately change or modify the appearance of the skin by changing light reflection on the skin and the like, even if the cosmetic film does not include any cosmetic active ingredient. Therefore, it may be possible for the above cosmetic film to conceal skin defects such as pores or wrinkles. Further, the above cosmetic film may immediately change or modify the feel to the touch of the skin by changing the surface roughness on the skin and the like. Furthermore, the above cosmetic film may immediately protect the skin by covering the surface of the skin and shielding the skin, as a barrier, from environmental stresses such as pollutants, contaminants and the like.

The above cosmetic effects can be adjusted or controlled by changing the chemical composition, the thickness and/or the surface roughness of the above cosmetic film.

If the above cosmetic film includes at least one additional cosmetic active ingredient other than the (c) oil, the cosmetic film can have cosmetic effects provided by the additional cosmetic active ingredient(s). For example, if the cosmetic film includes at least one cosmetic active ingredient selected from anti-aging agents, anti-sebum agents, deodorant agents, anti-perspirant agents, whitening agents and a mixture thereof, the cosmetic film can treat the aging of the skin, absorbing sebum on the skin, controlling odors on the skin, controlling perspiration on the skin, and/or whitening of the skin.

It is also possible to apply a makeup cosmetic composition onto the cosmetic film or sheet according to the present invention after it has been applied onto the skin.

EXAMPLES

The present invention will be described in a more detailed manner by way of examples.

However, they should not be construed as limiting the scope of the present invention.

[Preparation of Polyion Complex Particle]

Example 1

0.20 g of sodium hyaluronate and 0.40 g of polyepsilon-lysine (25% water solution) were mixed in 98.79 g of water with 0.5 g of phenoxyethanol by using a stirrer, followed by adding 0.11 g of phytic acid (50% water solution)while stirring. Thereby, a stable polyion complex gel particle (PGP) dispersion was successfully prepared. The final pH of the PGP dispersion according to Example 1 was 6.0.

The ingredients used to prepare the PGP dispersion according to Example 1 are shown in Table 1. The numerical values for the amounts of the ingredients shown in Table 1 are all based on "g".

Examples 2-4

The procedures according to Example 1 were repeated with the proviso that the ingredients shown in Table 1 were used to prepare stable PGP dispersions according to Examples 2-4.

The molecular weight of the polyepsilon-lysine was 4000.

In Example 5, instead of sodium hyaluronate which is an anionic polymer, hydroxypropyltrimonium hyaluronate which is an amphoteric polymer was used.

TABLE 1

|  | Ex. 1 | Ex. 2 | Ex. 3 | Ex. 4 | Ex. 5 |
|---|---|---|---|---|---|
| Water | qsp 100 | qsp 100 | qsp 100 | qsp 100 | qsp 100 |
| Sodium Hyaluronate | 0.20 | 0.20 | 0.20 | 1.00 | — |
| Polyepsilon-Lysine (25% aqueous solution) | 0.40 | 0.60 | 0.80 | 0.40 | — |
| Hydroxypropyltrimonium Hyalronate | — | — | — | — | 1.00 |
| Phytic Acid (50% aqueous solution) | 0.11 | 0.17 | 0.22 | 0.11 | 0.11 |
| Phenoxyethanol | 0.50 | 0.50 | 0.50 | 0.50 | 0.50 |
| Glycerin | — | — | — | — | 5.00 |
| Total | 100.0 | 100.0 | 100.0 | 100.0 | 100.0 |
| pH | 6.0 | 7.6 | 6.8 | 6.1 | 3.9 |

[Preparation and Microscopic Evaluation of Film Made from PGP]

Each of the compositions according to Examples 1-3 was observed with fluorescence microscopy. It was found that PGPs were uniformly dispersed in the compositions.

After the microscopic observation, each of the compositions according to Examples 1-3 was casted on a substrate and dried to form a film on the substrate. The surface of the film was observed again with fluorescence microscopy. It was found that the film was porous and made from the PGPs.

[Preparation and Matte Effect Evaluation of Film Made from PGP]

The composition according to Example 4 was spread over a contrast sheet by an automatic film applicator to form a film with a thickness of 100 μm and dried at 37° C. for 24 hours. Then, the gloss on the film was measured by a glossmeter. The gloss value was calculated under the conditions by setting 0 for a negative control and 100 for a positive control.

The measurement was repeated twice. The calculated gloss values were in a numerical range of between 50 and 60.

The above results show that the film made from the PGPs can provide matte effects.

[Preparation and Sebum Capturing Effect Evaluation of Film Made from PGP]

The composition according to Example 5 was casted on a substrate and dried to form a film on the substrate. 10 μl of oleic acid and water were dropped on the film. Then, the surface of the film was observed with fluorescence microscopy before and after the dropping of oleic acid and water. Also, the film 12 hours after the dropping of oleic acid and water was observed in the same manner.

It was found that the film surface structure changed by dropping oleic acid and water onto the film, and that oleic acid was captured in the film of PGPs. It was also found that, 12 hours after being captured by the film, oleic acid remained in the film.

Due to amphiphilic property of PGP, in response to the dropped oil, the PGP film flexibly changed its structure to capture oleic acid and maintain it in the PGP. Since oleic acid is oil and corresponds to sebum, it can be understood that the film is capable of capturing sebum.

[Preparation and Water-Resistance Evaluation of Film Made from PGP]

The composition according to Example 1 was casted on a substrate and dried to form a film on the substrate. The film was soaked in water. Before and after soaking in water, the surface of the film was observed with fluorescence microscopy. It was found that the surface of the film did not change by soaking in water. Accordingly, the film was found to be water-resistant.

[Texture Evaluations]

Examples 1-3

5 panelists evaluated the texture of the compositions according to Examples 1-3 at the timing of (a) during application of the composition when the composition has not yet started drying up, (b) during application of the composition when the composition has started drying up, and (c) 30 seconds after the application (when the composition had completely dried up).

As a benchmark, a hyaluronic acid dispersion with the same concentration was used. The panelists evaluated whether the compositions according to Examples 1-3 were superior to the benchmark at the timing of the above (a) to (c) with regard to the texture shown in Table 2. The numbers of the panelists which evaluated "Good", "Fair" and "Poor" are shown in Table 2.

TABLE 2

| Timing | Texture | Good | Fair | Poor |
|---|---|---|---|---|
| (a) | Less Sticky | 4 | 1 | 0 |
| (b) | Less Sticky | 4 | 1 | 0 |
| (c) | Soft and Moisturizing | 4 | 1 | 0 |

Good: The compositions according to Examples 1-3 were better than the benchmark
Fair: The compositions according to Examples 1-3 were comparable with the benchmark
Poor: The compositions according to Examples 1-3 were worse than the benchmark The above results demonstrate that the compositions according to Examples 1-3 can provide a less sticky texture during application as well as a softer and more moisturizing texture after application than a hyaluronic acid dispersion.

Example 5

5 panelists evaluated the texture of the composition according to Example 5 at the timing of (b) during application of the composition when the composition has started drying up, and (c) 30 seconds after the application (when the composition had completely dried up).

As a benchmark, a hyaluronic acid dispersion with the same concentration was used. The panelists evaluated whether the composition according to Example 5 was superior to the benchmark at the timing of the above (b) and (c) with regard to the texture shown in Table 3. The numbers of the panelists which evaluated "Good", "Fair" and "Poor" are shown in Table 3.

TABLE 3

| Timing | Texture | Good | Fair | Poor |
|---|---|---|---|---|
| (b) | Less Sticky | 4 | 1 | 0 |
| (c) | Soft and Moisturizing | 5 | 0 | 0 |

Good: The composition according to Example 5 was better than the benchmark
Fair: The composition according to Example 5 was comparable with the benchmark
Poor: The composition according to Example 5 was worse than the benchmark The above results demonstrate that the composition according to Example 5 can provide a less sticky texture during application as well as a softer and more moisturizing texture after application than a hyaluronic acid dispersion.

[Emulsification Evaluations]

O/W emulsions were prepared by using the composition according to Example 1. Each of the oily ingredients shown in Table 4 was added to the composition according to Example 1 and mixed with a homogenizer at 2500 rpm for 10 minutes. The amount of each oily ingredient is shown in Table 4. The numerical values for the amounts of the ingredients shown in Table 4 are all based on "% by weight" relative to the total weight of the mixture of the composition according to Example 1 and the oily ingredient.

Due to amphiphilic property of the PGP, oil encapsulation can be easily performed by a process of simply mixing a PGP dispersion and oil without heating or strong shearing.

After the observation, the composition according to Example 6 was casted on a substrate and dried to form a film on the substrate. The film was observed with fluorescence microscopy. It was found that the film was porous and made from the PGPs and that the non-porous part of the film included the oil. The oil was not present in the pores of the film.

The invention claimed is:

1. A composition, comprising:
   (a) at least one particle, comprising
      at least one cationic polymer and at least one anionic polymer,
      at least one cationic polymer and at least one amphoteric polymer,
      at least one anionic polymer and at least one amphoteric polymer, or
      at least one amphoteric polymer, and
      at least one non-polymeric acid having two or more pKa values or salt(s) thereof or
      at least one non-polymeric base having two or more pKb values or salt(s) thereof; and
   (b) water, wherein
      the anionic polymer is selected from hyaluronic acid, and esters and salts thereof, and
      the amphoteric polymer is selected from cationized hyaluronic acid and salts thereof.

2. The composition according to claim 1, wherein the cationized hyaluronic acid has at least one quaternary ammonium group-containing group and has a degree of cationization of 0.05 to 0.6.

TABLE 4

| | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Squalane | 0.05 | 0.2 | 0.4 | — | — | — | — | — | — | — | — | — |
| Isopropyl Myristate | — | — | — | 0.05 | 0.2 | 0.4 | — | — | — | — | — | — |
| Octyl Dodecanol | — | — | — | — | — | — | 0.05 | 0.4 | — | — | — | — |
| Caprylic/Capric Triglyceride | — | — | — | — | — | — | — | — | 0.05 | — | — | — |
| Apricot Oil | — | — | — | — | — | — | — | — | — | 0.05 | — | — |
| Dimethicone | — | — | — | — | — | — | — | — | — | — | 0.05 | 0.4 |
| Stability | Very Stable | Very Stable | Stable | Very Stable | Stable | Stable | Stable | Stable | Very Stable | Very Stable | Very Stable | Stable |

The O/W emulsions according to Examples 6-17 were stored at room temperature for 1 month. The aspect of each emulsion was visually observed and evaluated in accordance with the following criteria.

Very Stable: No phase separation was observed
Stable: Slight phase separation was observed, but the aspect was almost homogeneous as a whole The results are shown in Table 4. All the emulsions according to Examples 6-17 were stable or very stable.

It was found that both polar oil such as caprylic/capric triglyceride and non-polar oil such as squalane can be used to prepare emulsions with PGP. It should be noted that no surfactant is necessary for preparing emulsions with PGP.

Next, the emulsion according to Example 6 was observed with a microscope. It was found that oil droplets were uniformly dispersed in an aqueous phase. The diameter of the oil droplets was smaller than 30 μm.

Then, the oil droplets were dyed with Nile Red and the aqueous phase was dyed with Pyranine. It was found by microscopic observation of the emulsion that the oil was encapsulated in the PGPs.

3. The composition according to claim 1, wherein the cationic polymer has at least one positively chargeable and/or positively charged moiety selected from the group consisting of a secondary or tertiary amino group, a quaternary ammonium group, a guanidine group, a biguanide group, an imidazole group, an imino group, a pyridyl group, and an amino group.

4. The composition according to claim 1, wherein the cationic polymer is selected from the group consisting of cyclopolymers of alkyldiallylamine and cyclopolymers of dialkyldiallylammonium comprises (co)polydiallyldialkyl ammonium chloride, (co)polyamines comprises (co)polylysines, cationic (co)polyaminoacids such as collagen, cationic cellulose polymers, and salts thereof.

5. The composition according to claim 1, wherein the total amount of the cationic and/or anionic and/or amphoteric polymer(s) forming the (a) particle in the composition is from 0.01% to 15% by weight, relative to the total weight of the composition.

6. The composition according to claim 1, wherein the nonpolymeric acid having two or more pKa values or salt(s) thereof is an organic acid or salt(s) thereof.

7. The composition according to claim 1, wherein the amount of the non-polymeric acid having two or more pKa values or salt(s) thereof or non-polymeric base having two or more pKb values or salt(s) thereof in the composition is from 0.01% to 15% by weight, relative to the total weight of the composition.

8. The composition according to claim 1, wherein the amount of the (a) particle in the composition is from 0.01% to 30% by weight, relative to the total weight of the composition.

9. The composition according to claim 1, wherein the amount of the (b) water in the composition is from 50% to 99.9% by weight, relative to the total weight of the composition.

10. The composition according to claim 1, wherein the pH of the composition is from 3 to 9.

11. The composition according to claim 1, wherein the composition further comprises (c) at least one oil.

12. The composition according to claim 1, wherein the composition is a cosmetic composition.

13. A process for preparing a film, comprising:
applying onto a substrate the composition according to claim 1; and
drying the composition.

14. A film prepared by a process comprising:
applying onto a substrate the composition according to claim 1; and
drying the composition.

15. A film comprising:
at least one cationic polymer and at least one anionic polymer,
at least one cationic polymer and at least one amphoteric polymer,
at least one anionic polymer and at least one amphoteric polymer, or
at least one amphoteric polymer;
at least one non-polymeric acid having two or more pKa values or salt(s) thereof or at least one non-polymeric base having two or more pKb values or salt(s) thereof; and
optionally at least one oil, wherein
the anionic polymer is selected from hyaluronic acid and esters and salts thereof; and
the amphoteric polymer is selected from cationized hyaluronic acid and salts thereof.

16. A cosmetic process for a keratin substance such as skin, comprising
applying to the keratin substance the composition according to claim 1; and
drying the composition to form a cosmetic film on the keratin substance.

\* \* \* \* \*